United States Patent
Kim

(10) Patent No.: US 12,101,819 B2
(45) Date of Patent: Sep. 24, 2024

(54) METHOD AND DEVICE FOR TRANSMITTING USER DATA THROUGH TWO-STAGE RANDOM ACCESS PROCESS IN MOBILE COMMUNICATION SYSTEM

(71) Applicant: Samsung Electronics Co., Ltd., Suwon-si (KR)

(72) Inventor: Sangbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 17/422,203

(22) PCT Filed: Jan. 13, 2020

(86) PCT No.: PCT/KR2020/000605
§ 371 (c)(1),
(2) Date: Jul. 12, 2021

(87) PCT Pub. No.: WO2020/149595
PCT Pub. Date: Jul. 23, 2020

(65) Prior Publication Data
US 2022/0124815 A1    Apr. 21, 2022

(30) Foreign Application Priority Data
Jan. 14, 2019   (KR) .......................... 10-2019-0004823

(51) Int. Cl.
*H04W 74/08* (2009.01)
*H04W 74/0833* (2024.01)

(52) U.S. Cl.
CPC .............. *H04W 74/0833* (2013.01)

(58) Field of Classification Search
CPC ................................................ H04W 74/0833
(Continued)

(56) References Cited

U.S. PATENT DOCUMENTS 9,907,095 B2 *  2/2018  Han ....................... H04L 5/0053
10,051,636 B2   8/2018  Zeng et al.
(Continued)

FOREIGN PATENT DOCUMENTS

CN   105099627 A   11/2015
CN   106686750 A    5/2017
(Continued)

OTHER PUBLICATIONS

International Search Report and Written Opinion of the International Searching Authority dated Apr. 22, 2020 in connection with International Application No. PCT/KR2020/000605, 9 pages.
(Continued)

*Primary Examiner* — Mong-Thuy T Tran

(57) ABSTRACT

Disclosed are: a communication technique for merging, with IoT technology, a 5th generation (5G) or pre-5G communication system for supporting a data transmission rate higher than that of a 4th generation (4G) communication system such as long term evolution (LTE); and a system therefor. The present disclosure can be applied to intelligent services (for example, smart home, smart building, smart city, smart car or connected car, healthcare, digital education, retail, security and safety-related services, and the like) on the basis of 5G communication technology and IoT-related technology. According to various embodiments of the present invention, provided are a method and a device for transmitting user data through a two-step random access process in a mobile communication system.

16 Claims, 25 Drawing Sheets

(58) Field of Classification Search
USPC .......................................................... 370/329
See application file for complete search history.

(56) References Cited

U.S. PATENT DOCUMENTS

| | | | |
|---|---|---|---|
| 10,499,275 | B2 | 12/2019 | Kim et al. |
| 10,826,557 | B2* | 11/2020 | Yuan ..................... H04L 5/0053 |
| 11,596,019 | B2* | 2/2023 | Chang ................... H04W 76/27 |
| 2015/0341912 | A1 | 11/2015 | Kim et al. |
| 2017/0099660 | A1* | 4/2017 | Oh ........................ H04L 5/0064 |
| 2018/0279186 | A1 | 9/2018 | Park et al. |
| 2018/0279375 | A1* | 9/2018 | Jeon ...................... H04W 72/23 |
| 2018/0324869 | A1 | 11/2018 | Phuyal et al. |
| 2019/0320467 | A1* | 10/2019 | Freda .................... H04L 5/0055 |
| 2020/0053795 | A1* | 2/2020 | Lin ........................ H04L 1/1812 |
| 2020/0187245 | A1* | 6/2020 | Fujishiro ........... H04W 74/0833 |
| 2022/0039060 | A1* | 2/2022 | Chang ................... H04W 76/27 |

FOREIGN PATENT DOCUMENTS

| | | | | |
|---|---|---|---|---|
| CN | 107637137 | A | 1/2018 | |
| EP | 3651503 | B1 * | 11/2021 | .............. H04W 4/70 |
| EP | 3955690 | A1 * | 2/2022 | .............. H04W 4/70 |
| KR | 10-2020-0069207 | A | 6/2020 | |
| WO | 2016148996 | A1 | 9/2016 | |
| WO | 2018175809 | A1 | 9/2018 | |
| WO | WO-2020083190 | A1 * | 4/2020 | ............ H04W 72/02 |
| WO | WO-2020088097 | A1 * | 5/2020 | ............ H04W 28/26 |

OTHER PUBLICATIONS

3GPP TS 36.300 V15.3.0 (Sep. 2018), Technical Specification, 3rd Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Sep. 2018, 358 pages.

MediaTek Inc., "Early Data Transmission on Preconfigured UL Resources in NB-IoT," R1-1808960, 3GPP TSG RAN WG1 Meeting #94, Gothenburg, Sweden, Aug. 20-24, 2018, 4 pages.

Nokia, et al., "On 2-step Random Access Procedure," R1-1901192, 3GPP TSG RAN WG1 Ad-Hoc Meeting 1901, Taipei, Taiwan, Jan. 21-25, 2019, 7 pages.

Samsung, "Initial Access and Mobility Procedure for NR-U," R1-1808769, 3GPP TSG RAN WG1 Meeting #94, Gothenburg, Sweden, Aug. 20-24, 2018, 8 pages.

The First Office Action issued Mar. 31, 2024, in connection with Chinese Patent Application No. 202080015335.4, 21 pages.

Office Action issued Jul. 8, 2024, in connection with Korean Patent Application No. 10-2019-0004823, 10 pages.

Notice of Allowance issued Jul. 19, 2024, in connection with Chinese Patent Application No. 202080015335.4, 7 pages.

* cited by examiner (a) EDT for Control Plane CIoT EPS Optimizations (b) EDT for User Plane CIoT EPS Optimizations (a)

(b)

(c)

(d)

(b) EDT for User Plane CIoT EPS Optimizations

METHOD AND DEVICE FOR TRANSMITTING USER DATA THROUGH TWO-STAGE RANDOM ACCESS PROCESS IN MOBILE COMMUNICATION SYSTEM

CROSS-REFERENCE TO RELATED APPLICATIONS

This application is a 371 National Stage of International Application No. PCT/KR2020/000605, filed Jan. 13, 2020, which claims priority to Korean Patent Application No. 10-2019-0004823, filed Jan. 14, 2019, the disclosures of which are herein incorporated by reference in their entirety.

BACKGROUND

1. Field

The disclosure relates to UE and base station operations in a mobile communication system, and relates to a method and a device for transmitting user data through a two-step random access process in a mobile communication system. Further, the disclosure relates to a method and a device for controlling an EDT-related access in a mobile communication system.

2. Description of Related Art

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System".

Implementation of the 5G communication system in ultra-high frequency (mmWave) bands, e.g., 60 GHz bands, is being considered in order to accomplish higher data transmission rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems.

In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

In the 5G system, support of various services is under consideration against the existing 4G system. For example, the most representative services may include enhanced mobile broad band (eMBB), ultra-reliable and low latency communication (URLLC), massive machine type communication (mMTC), and evolved multimedia broadcast/multicast service (eMBMS). In addition, a system for providing the URLLC service may be called an URLLC system, and a system for providing the eMBB service may be called an eMBB system. Further, the terms "service" and "system" may be interchangeably used.

Among them, the URLLC service, unlike the existing 4G system, is a service having been newly considered in the 5G system, and requires satisfaction of ultrahigh reliability (e.g., packet error rate of about 10-5) and low latency (e.g., about 0.5 msec) conditions as compared with other services. In order to satisfy such strict requirements, the URLLC service may require application of a transmission time interval (TTI) that is shorter than the TTI of the eMBB service, and various operation methods to utilize this have been considered.

On the other hand, the Internet, which is a human centered connectivity network where humans generate and consume information, is now evolving to the Internet of things (IoT) network where distributed entities, such as things, exchange and process information. The Internet of everything (IoE) technology, which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by techniques of beamforming, MIMO, and array antennas, which correspond to the 5G communication technology. Application of a cloud radio access network (cloud RAN) as the above-described big data processing technology may also be considered to be an example of convergence between the 5G technology and the IoT technology.

SUMMARY

An embodiment of the disclosure is to transmit user data through a two-step random access process in a mobile communication system.

Further, an embodiment of the disclosure is to control an EDT-related access in a mobile communication system.

Technical problems intended to be solved in the disclosure are not limited to the above-mentioned technical problems, and other unmentioned technical problems will be able to be clearly understood by those of ordinary skill in the art to which the disclosure pertains from the following description.

According to an embodiment of the disclosure to solve the above problems, a method performed by UE in a wireless communication system may include: transmitting, to a base station, a first message for transmitting a random access preamble including uplink data having a size smaller than a predetermined size in case that the uplink data is generated;

and receiving, from the base station, a second message for transmitting a random access response in response to the first message.

Further, the method may further include receiving, from the base station, system information including at least one of information on whether the base station supports a two-step random access process, information on whether the base station supports an early data transmission (EDT) for transmitting and receiving the data having the size smaller than the predetermined size in the two-step random access process, information on the predetermined size, or information on the EDT-dedicated preamble.

Further, the second message may include downlink data having a size smaller than a predetermined size and being transmitted to the UE.

Further, the method may further include: transmitting, to the base station, a random access preamble indicating transmission of the data having the size smaller than the predetermined size in case that the base station does not support an early data transmission (EDT) for transmitting and receiving the data having the smaller size in a two-step random access process; receiving a random access response message from the base station; transmitting, to the base station, a radio resource control (RRC) message including the uplink data; and receiving, from the base station, an RRC response message in response to the RRC message.

According to an embodiment of the disclosure to solve the above problems, a method performed by a base station in a wireless communication system may include: receiving, from a UE, a first message for transmitting a random access preamble including uplink data having a size smaller than a predetermined size in case that the uplink data is generated in the UE; and transmitting, to the UE, a second message for transmitting a random access response in response to the first message.

Further, the method may further include broadcasting system information including at least one of information on whether the base station supports a two-step random access process, information on whether the base station supports an early data transmission (EDT) for transmitting and receiving the data having the size smaller than the predetermined size in the two-step random access process, information on the predetermined size, or information on the EDT-dedicated preamble.

Further, the second message may include downlink data having a size smaller than a predetermined size and being transmitted to the UE.

Further, the method may further include: receiving, from the UE, a random access preamble indicating transmission of the data having the size smaller than the predetermined size in case that the base station does not support an early data transmission (EDT) for transmitting and receiving the data having the smaller size in a two-step random access process; transmitting a random access response message to the UE; receiving, from the UE, a radio resource control (RRC) message including the data having the smaller size; and transmitting, to the UE, an RRC response message in response to the RRC message.

According to an embodiment of the disclosure to solve the above problems, a UE in a wireless communication system may include: a transceiver; and a controller configured to control to: transmit, to a base station, a first message for transmitting a random access preamble including uplink data having a size smaller than a predetermined size in case that the uplink data is generated, and receive, from the base station, a second message for transmitting a random access response in response to the first message.

According to an embodiment of the disclosure to solve the above problems, a base station in a wireless communication system may include: a transceiver; and a controller configured to control to: receive, from a UE, a first message for transmitting a random access preamble including uplink data having a size smaller than a predetermined size in case that the uplink data is generated in the UE, and transmit, to the UE, a second message for transmitting a random access response in response to the first message.

According to an embodiment of the disclosure, the mobile communication system can transmit the user data through the two-step random access process.

Further, according to an embodiment of the disclosure, the mobile communication system can control the EDT-related access.

Effects that can be obtained in the disclosure are not limited to the above-mentioned effects, and other unmentioned effects will be able to be clearly understood by those of ordinary skill in the art to which the disclosure pertains from the following description.

DETAILED DESCRIPTION

Figure 1:
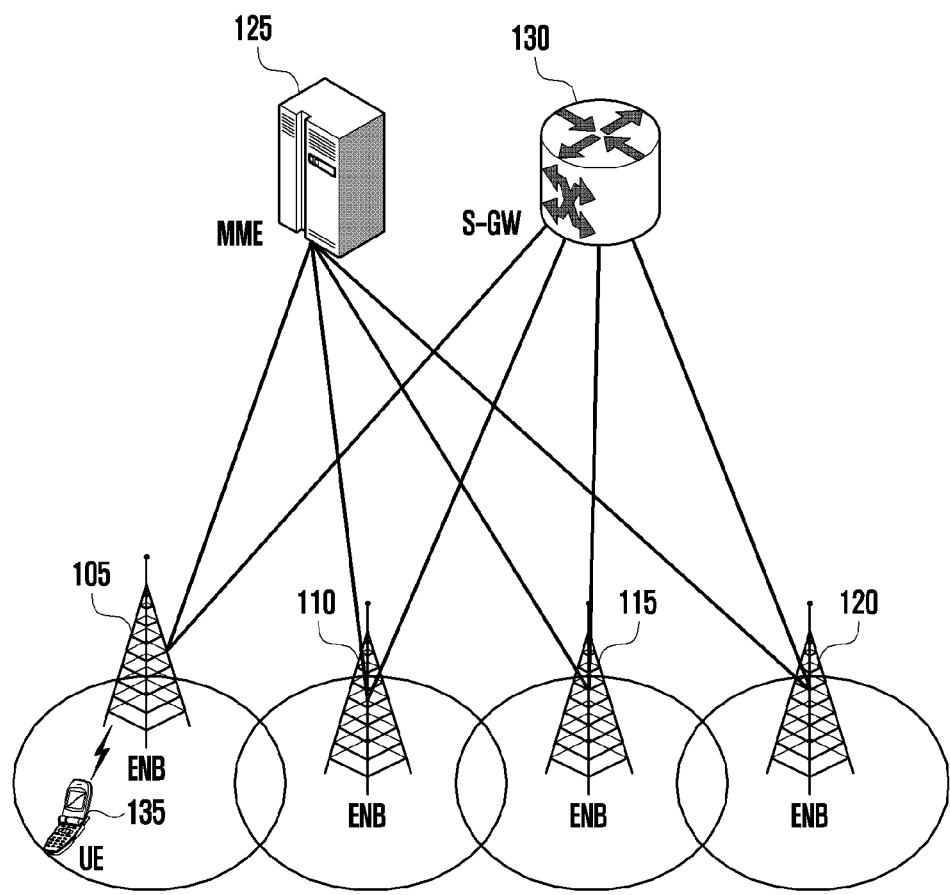
FIG. 1 is a diagram illustrating the structure of an LTE system according to an embodiment of the disclosure.

Hereinafter, embodiments of the disclosure will be described in detail with reference to the accompanying drawings.

In describing the disclosure hereinafter, detailed explanation of related known functions or configurations will be omitted if it is determined that it obscures the gist of the disclosure in unnecessary detail. This is to transfer the gist of the disclosure more clearly without obscuring the same through omission of unnecessary explanations.

For the same reason, in the accompanying drawings, some constituent elements may be exaggerated, omitted, or briefly illustrated. Further, sizes of the respective constituent elements do not completely reflect the actual sizes thereof. In the drawings, the same reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the embodiments of the disclosure are only specific details provided to assist those of ordinary skill in the art in a comprehensive understanding of the disclosure, and the disclosure is only defined within the scope of the appended claims. In the entire description of the disclosure, the same reference numerals are used for the same elements across various figures.

In this case, it will be understood that each block of the flowchart illustrations, and combinations of blocks in the flowchart illustrations, can be performed by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card. Further, according to some embodiments, the "~units" may include one or more processors.

Hereinafter, the operation principle of the disclosure will be described in detail with reference to the accompanying drawings. In describing the disclosure hereinafter, detailed explanation of related known functions or configurations will be omitted if it is determined that it obscures the gist of the disclosure in unnecessary detail. Further, terms to be described later are terms defined in consideration of their functions in the disclosure, but may differ depending on intentions of a user or an operator, or customs. Accordingly, they should be defined on the basis of the contents of the whole description of the disclosure. Hereinafter, a base station is the subject that performs resource allocation to a UE, and it may be at least one of gNode B, eNode B, Node B, base station (BS), radio access unit, base station controller, or node on a network. A UE may include user equipment (UE), mobile station (MS), cellular phone, smart phone, computer, or multimedia system capable of performing a communication function. Of course, the base station and the UE are not limited to the above-described examples.

Hereinafter, in the disclosure, technology for a UE to receive broadcasting information from a base station in a wireless communication system will be described. The disclosure relates to a communication technique for converging IoT technology with a 5G communication system for supporting a higher data transmission rate beyond a 4G system and a system thereof. The disclosure may be applied to intelligent services (e.g., smart home, smart building, smart city, smart car or connected car, healthcare, digital education, retail, security and safety-related services, and the like) based on 5G communication technology and IoT-related technology.

As used in the following description, a term to refer to broadcasting information, a term to refer to control information, a term related to a communication coverage, a term to refer to a status change (e.g., event), a term to refer to network entities, a term to refer to messages, and a term to refer to a constituent element of a device have been exemplified for convenience in explanation. Accordingly, the disclosure is not limited to the terms to be described later, and other terms having equivalent technical meanings may be used.

Hereinafter, with reference to the accompanying drawings, embodiments of the disclosure will be described. The disclosure is described based on an LTE system, but is applied event to other mobile communication systems, such as NR or the like, that is the next-generation mobile communication system. As an example, in the disclosure, an eNB in the LTE corresponds to a gNB in the NR, and an MME in the LTE corresponds to an AMF in the NR.

FIG. 1 is a diagram illustrating the structure of an LTE system according to an embodiment of the disclosure.

Referring to FIG. 1, as illustrated, a radio access network of an LTE system is composed of evolved node Bs (hereinafter referred to as "ENBs", "node Bs", or "base stations") 105, 110, 115, and 120, a mobility management entity (MME) 125, and a serving-gateway (S-GW) 130. User equipment (hereinafter referred to as "UE" or "terminal") 135 accesses an external network through the ENBs 105 to 120 and the S-GW 130.

In FIG. 1, the ENBs 105 to 120 correspond to existing node Bs of a universal mobile telecommunication system (UMTS). The ENBs 105 to 120 are connected to the UE 135 on a radio channel, and play more complicated roles than those of the existing node Bs. In the LTE system, since all user traffics including a real-time service, such as a voice over IP (VoIP) through an Internet protocol, are serviced on shared channels, entities performing scheduling through gathering of state information, such as a buffer state, an available transmission power state, and a channel state of UEs, are necessary, and the ENBs 105 to 120 take charge of this. In general, one ENB 105 to 120 controls a plurality of cells. For example, in order to implement a transmission speed of 100 Mbps, the LTE system uses, for example, orthogonal frequency division multiplexing (hereinafter referred to as "OFDM") as a radio access technology in a bandwidth of 20 MHz. Further, the LTE system adopts an adaptive modulation & coding (hereinafter referred to as "AMC") scheme that determines a modulation scheme and a channel coding rate to match the channel state of the UE 135. The S-GW 130 is an entity that provides a data bearer, and generates or removes the data bearer under the control of the MME 125. The MME 125 is an entity that takes charge of not only a mobility management function of the UE 135 but also various kinds of control functions, and is connected to the plurality of base stations 105 to 120.

Figure 2:
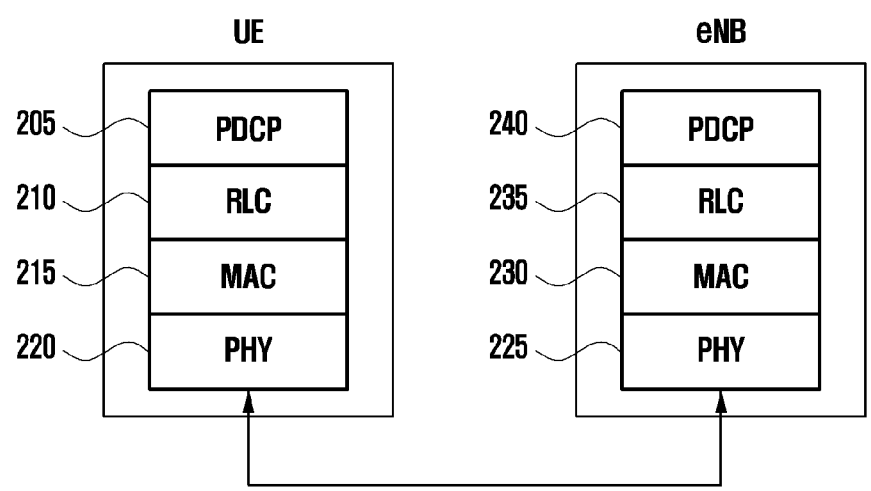
FIG. 2 is a diagram illustrating a radio protocol structure in an LTE system according to an embodiment of the disclosure.

FIG. 2 is a diagram illustrating a radio protocol structure in an LTE system according to an embodiment of the disclosure.

Referring to FIG. 2, in UE or an ENB, a radio protocol of an LTE system is composed of a packet data convergence protocol (PDCP) 205 or 240, a radio link control (RLC) 210 or 235, and a medium access control (MAC) 215 or 230. The packet data convergence protocol (PDCP) 205 or 240 takes charge of IP header compression/decompression operations, and the radio link control (RLC) 210 or 235 performs an automatic repeat request (ARQ) operation or the like by reconfiguring a PDCP packet data unit (PDU) with a proper size. The MAC 215 or 230 is connected to several RLC layer devices configured in one UE, and performs multiplexing of RLC PDUs into MAC PDU and demultiplexing of the RLC PDUs from the MAC PDU. A physical layer 220 or 225 performs channel coding and modulation of higher layer data to configure and transmit OFDM symbols on a radio channel, or performs demodulation and channel decoding of the OFDM symbols received on the radio channel to transfer the demodulated and channel-decoded OFDM symbols to a higher layer.

Figure 3:
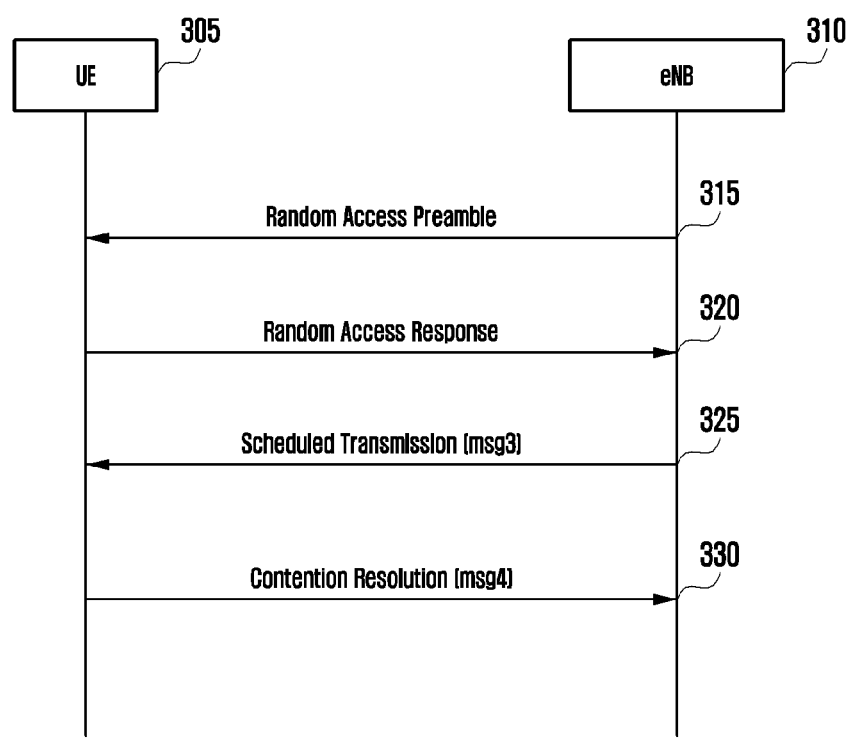
FIG. 3 is a diagram explaining a random access process in an embodiment of the disclosure.

FIG. 3 is a diagram explaining a random access process in an embodiment of the disclosure.

A random access is performed when uplink synchronization is performed or when data is transmitted to a network. More specifically, the random access may be performed in case of switchover from an idle mode to a connected mode, in case of performing radio resource control (RRC) reestablishment, in case of performing a handover, or in case of starting uplink/downlink data. Referring to FIG. 3, if a dedicated preamble is provided from a base station 310, user equipment (UE) 305 may transmit the preamble by applying the preamble (operation 315). Otherwise, the UE 305 may select one of two preamble groups, and may select the preamble belonging to the selected group. The groups are called group A and group B. If a channel quality status is better than a specific threshold value, and the size of msg3 is larger than a specific threshold value, the UE 305 may select the preamble belonging to group B, and otherwise, the UE 305 may select the preamble belonging to group A. If the UE 305 has transmitted the preamble to the base station 310 in the n-th subframe (operation 315), the UE 305 starts a random access response (RAR) window from the (n+3)-th subframe, and monitors whether the RAR is transmitted in the window time interval (operation 320). Scheduling information of the RAR is indicated by RA-RNTI of PDCCH. The RA-RNTI is induced using a time for use in transmitting the preamble and a radio resource location on a frequency axis. The RAR includes a timing advance command, UL grant, and temporary C-RNTI. If the UE 305 has successfully received the RAR in the RAR window, the UE 305 transmits msg3 to the base station 310 using UL grant information included in the RAR (operation 325). The msg3 includes different information depending on the purpose of the random access. Table 1 below exemplifies information included in the msg3.

TABLE 1

| CASE | Message 3 Contents |
|---|---|
| RRC CONNECTION SETUP | CCCH SDU |
| RRC RE-ESTABLISHMENT | CCCH SDU, BSR (if grant is enough), PHR (if triggered & grant is enough) |
| Handover (random preamble) | C-RNTI CE, BSR, PHR, (part of) DCCH SDU |
| Handover (dedicated preamble) | BSR, PHR, (part of) DCCH SDU |
| UL resume | C-RNTI CE, BSR, PHR, (part of) DCCH/DTCH SDU |
| PDCCH order (random preamble) | C-RNTI CE, BSR, PHR, (part of) DCCH/DTCH SDU |
| PDCCH order (dedicated preamble) | BSR, PHR, (part of) DCCH/DTCH SDU |

If the UE 305 has received the RAR in the n-th subframe, the msg3 is transmitted in the (n+6)-th subframe. From the msg3, hybrid ARQ (HARD) is applied. After transmission of the msg3, the UE 305 drives a specific timer, and monitors a contention resolution (CR) message until the timer expires (operation 330). The CR message includes an RRC Connection Setup or RRC Connection Reestablishment message depending on the purpose of the random access in addition to CR MAC CE.

The disclosure proposes a technology to transmit and receive user data with a predetermined small size in the random access process with the base station in a state where the UE in an idle mode (RRC_Idle) or in an inactive mode (RRC_Inactive) is not switched to a connected mode (RRC_Connected) in a mobile communication system. In the disclosure, the technology is called early data transmission (EDT). In particular, the disclosure proposes a method in which an uplink UE transmits user data to a base station (mobile originated (MO)-initiated) using the EDT technology. In the disclosure, the uplink transmission is called uplink early data transmission (UL EDT). The disclosure is featured to store the user data in msgA message to be transmitted in a two-step random access process. Although the detailed contents of the disclosure has been described based on an LTE system, the technology of the disclosure is also applicable to an NR system. For example, eNB corresponds to gNB, and MME corresponds to AMF.

Figure 4A:
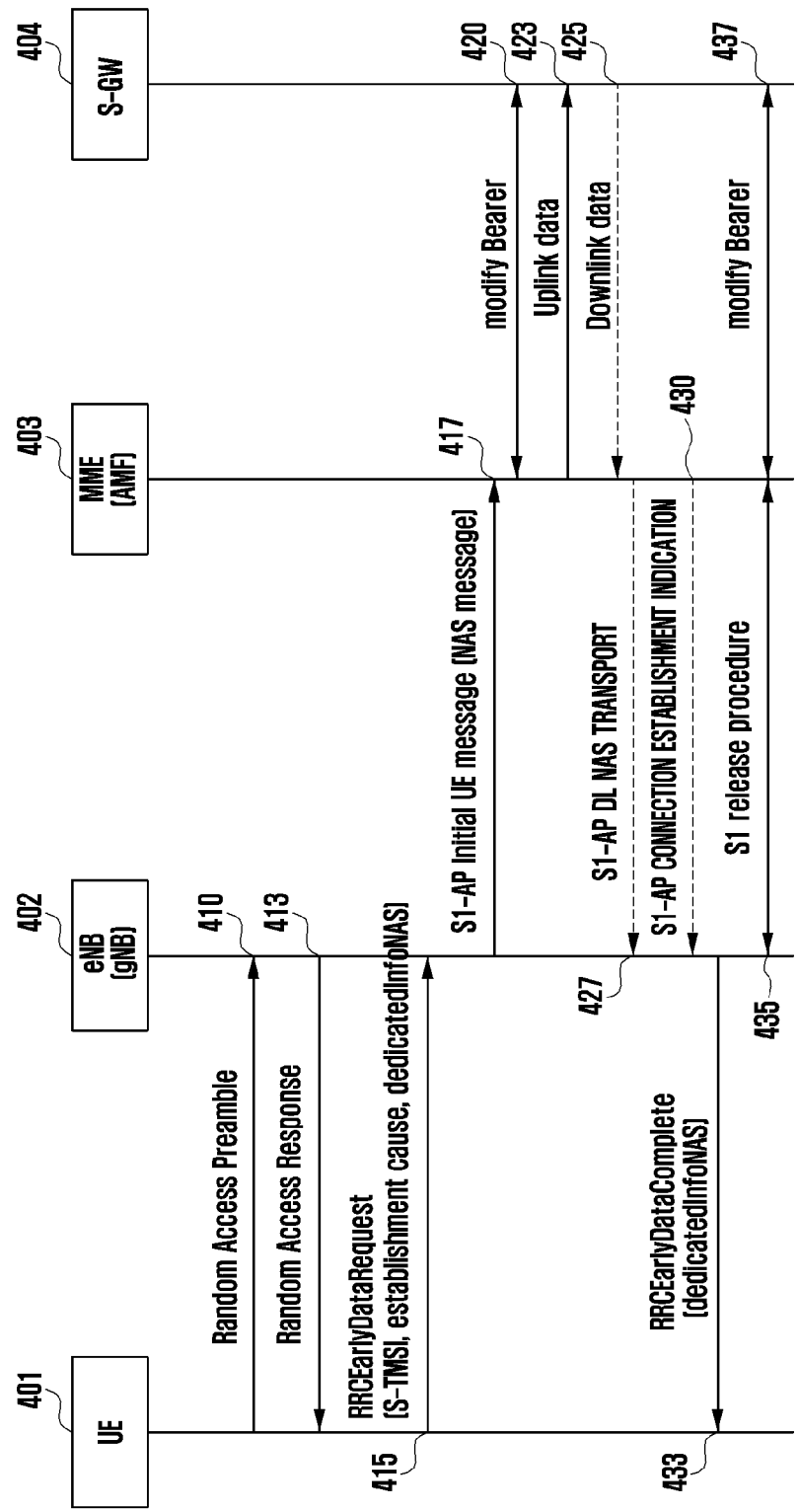
FIGS. 4A and 4B are flowcharts illustrating an uplink EDT operation according to an embodiment of the disclosure.
Figure 4B:
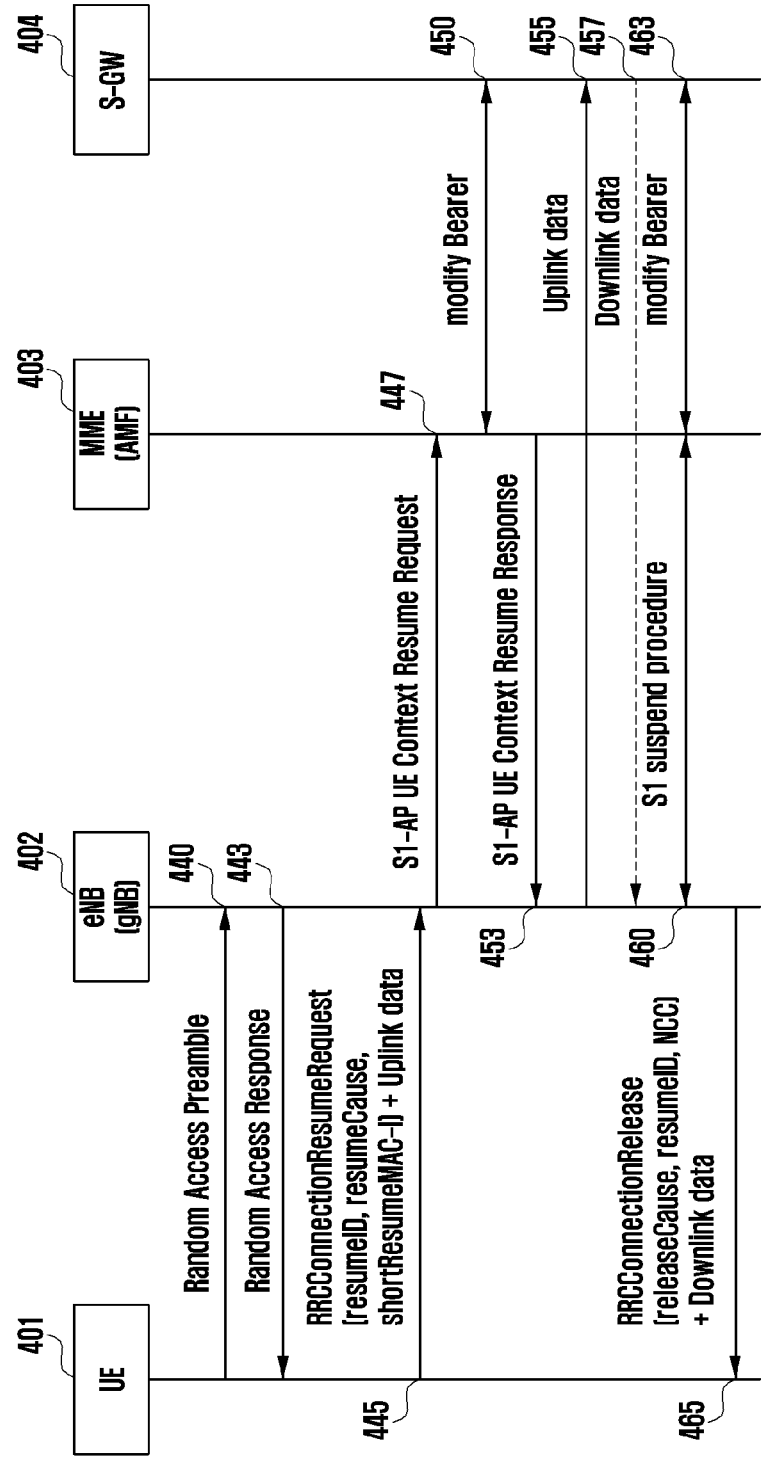

FIGS. 4A and 4B are flowcharts illustrating an uplink EDT operation in a four-step random access process according to an embodiment of the disclosure.

As a method for transmitting user data to a base station in a four-step random access process, control plane (CP) EDT and user plane (UP) EDT exist.

FIG. 4A is a flowchart illustrating a CP EDT operation. The CP EDT has the following features.

Uplink user data may be stored in a NAS container of an RRCEarlyDataRequest message to be transmitted, which is one RRC message belonging to CCCH.

Selectively, downlink user data may be stored in a NAS container of an RRCEarlyDataComplete message to be transmitted, which is one RRC message belonging to the CCCH.

In the above process, switchover to an RRC connected mode does not occur.

Specifically, referring to FIG. 4A, if there is a request for uplink user data transmission from a higher layer of a UE in a connection establishment request process, the UE 401 initializes the EDT process according to a predetermined condition, and selects one random access preamble configured for the EDT process (operation 410).

A base station 402 transmits a random access response message (RAR) for the preamble to the UE 401 (operation 413).

The UE 401 stores the NAS container (NAS message) including the user data in the RRCEarlyDataRequest that is one RRC message belonging to the CCCH, and transmits the message to the base station 402 (operation 415).

The base station 402 stores the NAS container in S1-AP Initial UE message, and transmits the message to an MME (or AMF) 403 (operation 417). In this case, S1 connection is established. In the above process, the base station 402 may indicate that this connection has been triggered by the EDT to the MME (or AMF) 403.

The MME 403 requests S-GW 404 to reactivate an EPS bearer for the UE 401 (operation 420), and transmits the user data to the S-GW 404 (operation 423). If downlink user data for the UE 401 is effective, the S-GW 404 transmits the downlink user data to the MME 403 (operation 425).

The MME 403 having received the downlink user data may transmit the data to the base station 402 through a DL NAS Transport process (operation 427). Alternatively, the MME 403 may trigger an S1-AP Connection Establishment Indication process (operation 430). The base station 402 stores the downlink user data in the NAS container of the RRCEarlyDataComplete message that is one RRC message belonging to the CCCH, and transmits the message to the UE 401 (operation 433). If the MME 403 has not provided the downlink user data, the base station 402 transmits the RRCEarlyDateComplete message to the UE 401 without the downlink user data.

Thereafter, the S1 connection is released (operation 435), and the EPS bearer is inactivated (operation 437).

If additional data transmission/reception is necessary, the MME 403 or the base station 402 may switch the UE 401 to the connected mode. If the switchover is triggered, the base station 402 transmits the RRCConnectionSetup message to the UE 401 instead of the RRCEarlyDataComplete message. This means that the conventional RRC connection establishment process has been triggered.

FIG. 4B is a flowchart illustrating an UP EDT operation. The UP EDT has the following features.

In order to trigger the UP EDT, the UE 401 should be in an inactive mode through reception of an RRCConnectionRelease (or RRCRelease) message indicating that the UE is previously switched to the inactive mode. In this case, through the RRC message, NextHopChainingCount information is provided to the UE 401.

The uplink user data is transmitted on DTCH, and is multiplexed into RRCConnectionResumeRequest that is one RRC message belonging to the CCCH. That is, the RRC message and the DTCH are stored in the msg3 together.

Selectively, the downlink user data is transmitted on the DTCH, and is multiplexed into the RRCConnectionRelease message that is one RRC message belonging to DCCH. That is, the RRC message and the DTCH are stored in msg4 together.

For the RRCConnectionResumeRequest message, short resume MAC-I is reused as an authentication token, and is derived using an integrity key used in the previous connection.

The uplink/downlink user data is ciphered. Security keys being applied are derived using the NextHopChainingCount provided in the RRCConnectionRelease message in the previous connection.

The RRCConnectionRelease message in the msg4 has integrity and is ciphered using newly derived security keys.

In the above process, switchover to the RRC connected mode does not occur.

Specifically, referring to FIG. 4B, if there is a request for uplink user data transmission from a higher layer of a UE in a connection establishment request process, the UE 401 initializes the EDT process according to a predetermined condition, and selects one random access preamble configured for the EDT process (operation 440).

A base station 402 transmits a random access response message (RAR) for the preamble to the UE 401 (operation 443).

The UE 401 transmits, to the base station 402, RRCConnectionResumeRequest including resume ID, establishment cause, and authentication token (operation 445). The UE 401 restarts all SRBs and DRBs, derives new security keys using NextHopChainingCount having been included in the RRCConnectionRelease message received through the previous connection, and reestablishes AS security. The uplink user data is ciphered and transmitted through DTCH, and is multiplexed into the RRCConnectionResumeRequest that is one RRC message belonging to CCCH. The base station 402 triggers an S1-AP Context Resume process (operation 447), and restarts SI connection. Further, an MME (or AMF) 403 reactivates an S1-U bearer.

The MME 403 requests S-GW 404 to reactivate the S1-U bearer for the UE 401 (operation 450). The MME 403 confirms UE context resumption to the base station 402 (operation 453).

The base station 402 having received the uplink user data from the UE 401 transmits the uplink user data to the S-GW 404 (operation 455).

If downlink user data for the UE 401 is effective, the S-GW 404 transmits the downlink user data to the base station 402 (operation 457).

If there is not additional data from the S-GW 404, the base station 402 may trigger suspension (operation 460) for the SI connection and inactivation of the S1-U bearer (operation 463).

In order to switch the UE 401 again to the inactive mode (RRC_Inactive), the base station 402 transmits, to the UE 401, the RRCConnectionRelease message including the release cause indicated as "rrc_Suspend", resume ID, NextHopChainingCount, and drb-ContinueROHC (operation 465). The listed information is stored inside the UE 401. If the downlink user data exists, the data is transmitted through DTCH, and is multiplexed into the RRCConnectionRelease message that is one RRC message belonging to the DCCH.

If additional data transmission/reception is necessary, the MME 403 or the base station 402 may switch the UE 401 to the connected mode. If the switchover is triggered, the base station 402 transmits the RRCConnectionResume message to the UE 401 instead of the RRCConnectionRelease message. This means that the conventional RRC connection establishment process has been triggered. The data may be transmitted through the DTCH, and may be multiplexed into the RRCConnectionResume message that is one RRC message.

Figure 5:
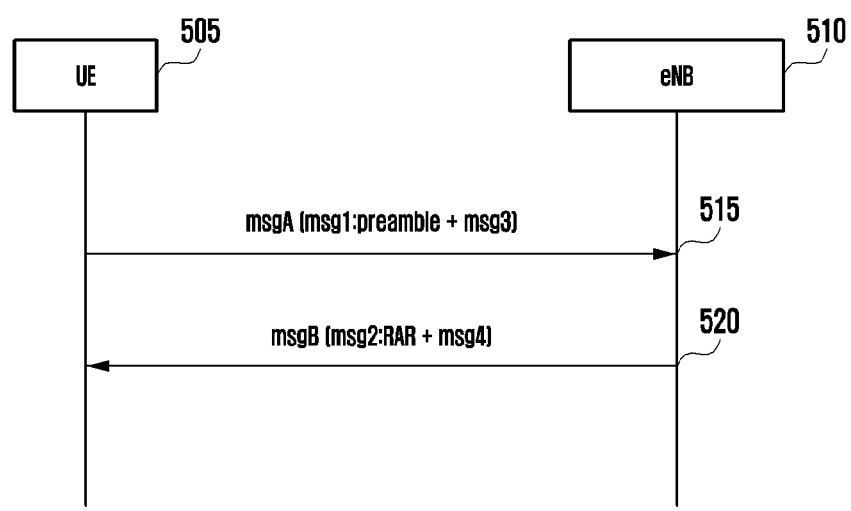
FIG. 5 is a flowchart illustrating a two-step random access process according to an embodiment of the disclosure.

FIG. 5 is a flowchart illustrating a two-step random access process according to an embodiment of the disclosure.

Referring to FIG. 5, the two-step random access process is composed of msgA (operation 515) transmitted by a UE 505 in an uplink and msgB (operation 520) transmitted by a base station 510 in a downlink. Conceptually, the msgA may have content of msg1 (i.e., preamble) and msg3, and scheduling information of the msgB in the conventional random access process, and the msgB may have content of msg2 (i.e., RAR) and msg4 in the conventional random access process. Information stored in the conventional msg3 is exemplified in Table 1 above. Information stored in the msg3 may differ depending on the purpose of the random access, and in the same manner, information stored in the msgA may differ depending on the purpose of the two-step random access. The information stored in the conventional msg2 is composed of a random access preamble identifier (RAPID), TA command, UL grant, and temporary C-RNTI.

Figure 6:
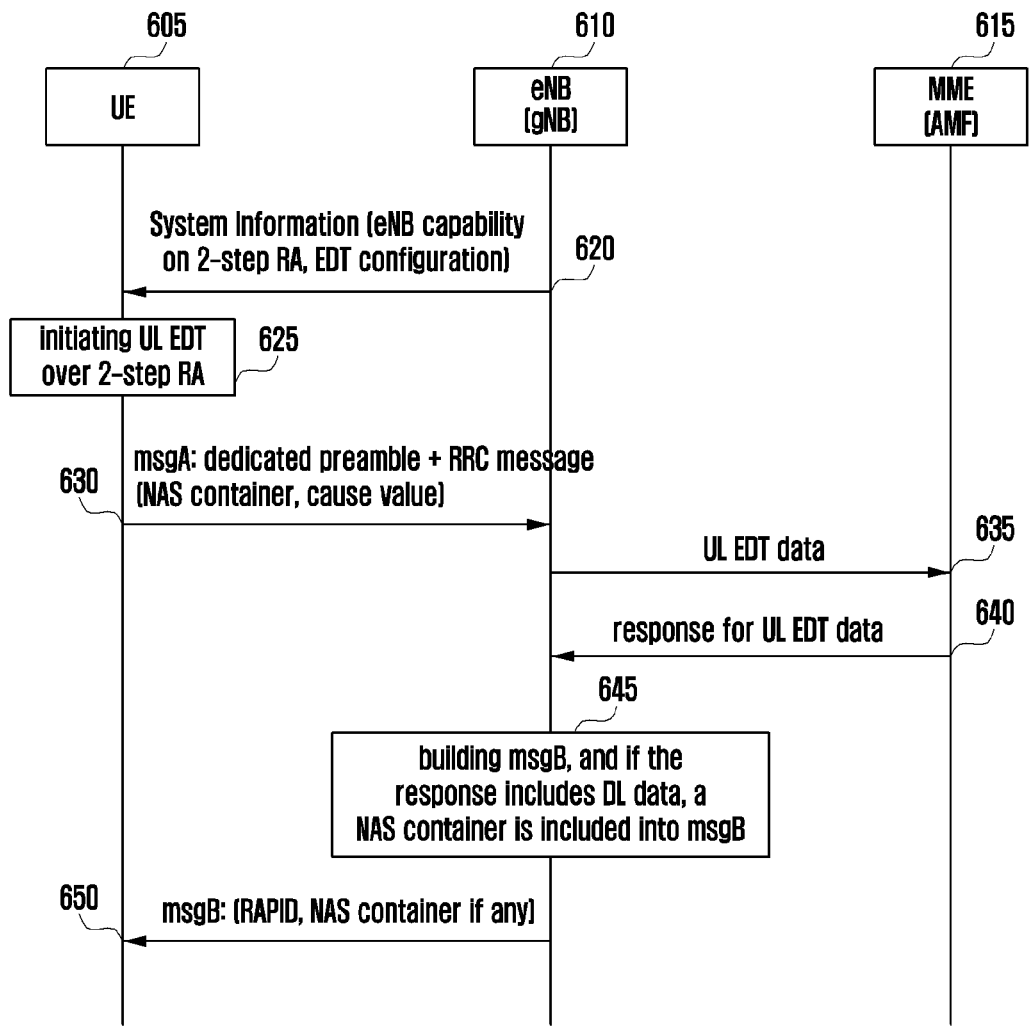
FIG. 6 is a flowchart illustrating an EDT operation in a two-step random access process according to an embodiment of the disclosure.

FIG. 6 is a flowchart illustrating an EDT operation in a two-step random access process according to an embodiment of the disclosure.

Referring to FIG. 6, a base station 610 may broadcast system information including capability information indicator indicating whether to support a two-step random access process, capability information indicator indicating whether to support a CP EDT or UP EDT process, EDT-dedicated preamble information, random access radio resources, and maximum transport block size (TBS) information transmittable to the EDT (operation 620).

A UE 605 determines whether to transmit data to be transmitted through an EDT operation based on a two-step RA on the basis of the information (operation 625). As an example, if the base station 610 supports two-step RA and CP or UP EDT, and the size of the data intended to be sent does not exceed the TBS, the UE 605 may trigger the CP or UP EDT operation based on the two-step RA.

If the CP EDT operation based on the two-step RA is triggered to transmit user data of a small size, the UE 605 configures and transmits msgA to the base station 610 (operation 630). The msgA includes an EDT-dedicated preamble or a series of sequences serving as the preamble and one RRC message. The RRC message includes a UE ID (e.g., S-TMSI), a cause value indicating an EDT access, and a NAS container (NAS message) storing the uplink user data. Usually, the NAS container stores information which the UE 605 transfers to an MME (or AMF) 615 that is not the base station 610. The information stored in the NAS container is ciphered by NAS security. The reason why the NAS container is used is to apply the NAS security. If not the two-step RA for the EDT, the NAS container is not included in the msgA. The base station 610 having received the msgA forwards the NAS container to the MME 615 (operation 635). The MME 615 may transmit a response message to the base station 610 (operation 640), and may provide downlink user data for the UE 605 to the base station 610. The base station 610 configures a msgB including an ID (e.g., RAPID) corresponding to the preamble or sequence included in the msgA (operation 645) and transmits the msgB to the UE 605 (operation 650). If the downlink user data for the UE 605 is received from the MME 615, the base station 610 includes the NA container storing the data in the msgB.

If the UE 605 is in an inactive mode (RRC_Inactive) state while satisfying the above conditions, it may trigger the UP EDT operation based on the two-step RA (operation 625). If the UP EDT operation based on the two-step RA is triggered to transmit user data of a small size, the UE 605 configures and transmits msgA (operation 630). The msgA includes an EDT-dedicated preamble or a series of sequences serving as the preamble and one RRC message. The RRC message includes a resumeID, a cause value indicating an EDT access, and shortResumeMAC-I. Further, the DTCH storing the uplink user data is multiplexed into the msgA. If not the two-step RA for the EDT, the DTCH is not included in the msgA. The base station 610 having received the msgA transmits the data to the S-GW. The S-GW may provide the downlink user data for the UE 605 to the base station 610. In this case, the MME 615 controls data transmission/reception between the base station 610 and the S-GW. The base station 610 configures a msgB including an ID (e.g., RAPID) corresponding to the preamble or sequence included in the msgA (operation 645), and transmits the msgB to the UE 605 (operation 650). The base station 610 stores one RRC message in the msgB, and the RRC message includes release cause, resumeID, and NCC. If the downlink user data for the UE 605 is received from the S-GW, the base station 610 multiplexes the DTCH storing the data into the msgB.

If additional data transmission/reception is required, the base station 610 or the MME 615 may switch the UE 605 to the connected mode. For this, the base station 610 stores the RRC message indicating switchover to the connected mode in the msgB. The RRC message is RRCConnectionSetup (in NR, RRCSetup).

Figure 7:
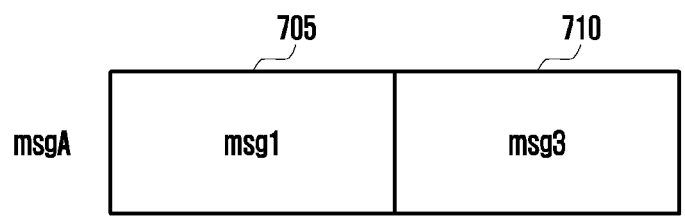
FIG. 7 is a configuration diagram of msgA message and msgB message according to an embodiment of the disclosure.
Figure 7:
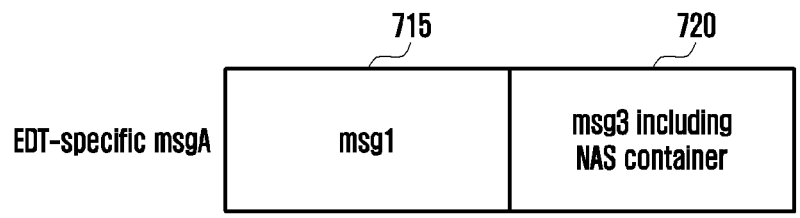
Figure 7:
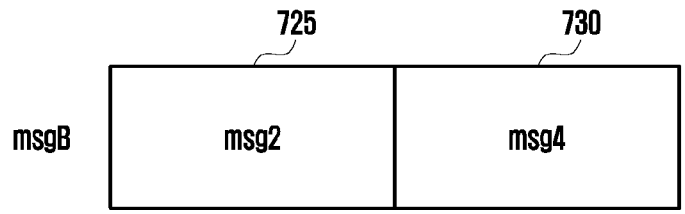
Figure 7:
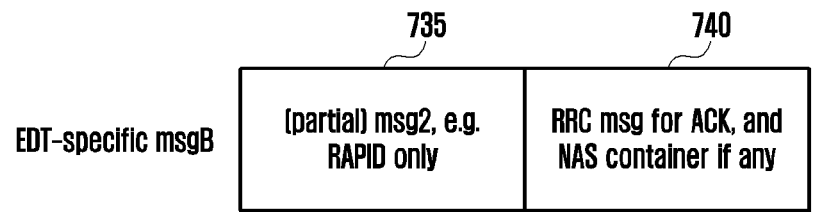

FIG. 7 is a configuration diagram of msgA message and msgB message according to an embodiment of the disclosure.

Referring to FIG. 7, configuration information of msgA and msgB in a two-step RA may differ depending on the purpose of the EDT.

A usual msgA exemplified in (a) of FIG. 7 is composed of a preamble or a sequence 705 playing a similar role, msg3 content 710, UE ID (e.g., S-TMSI or resumeID), and scheduling information (RNTI information, radio resource information, and common search space information) necessary for msgB transmission. Further, in the EDT-specific msgA exemplified in (b) of FIG. 7, a NAS container 720 for storing uplink user data or DTCH is additionally included in the preamble or a sequence 715 playing a similar role.

A usual msgB exemplified in (c) of FIG. 7 is composed of msg2 content 725 and msg4 content 730. The msg2 is composed of an ID corresponding to the preamble or sequence (RAPID), TA command, C-RNTI information to be applied after the switchover to the connected mode, and UL grant (if necessary). The msg4 content stores MAC CE for contention resolution and a predetermined RRC message depending on the purpose of RA.

Further, the EDT-specific msgB exemplified in (d) of FIG. 7 includes an ACK-specific RRC message. A NAS container 740 or DTCH for storing the downlink user data is additionally included. Further, since the UE is not necessary to be switched to the connected mode, the TA command, UL grant, and C-RNTI information that are necessary for this are excluded from the msgB (operation 735). Alternatively, even if being provided, they are not actually applied to the related UE operation.

Figure 8:
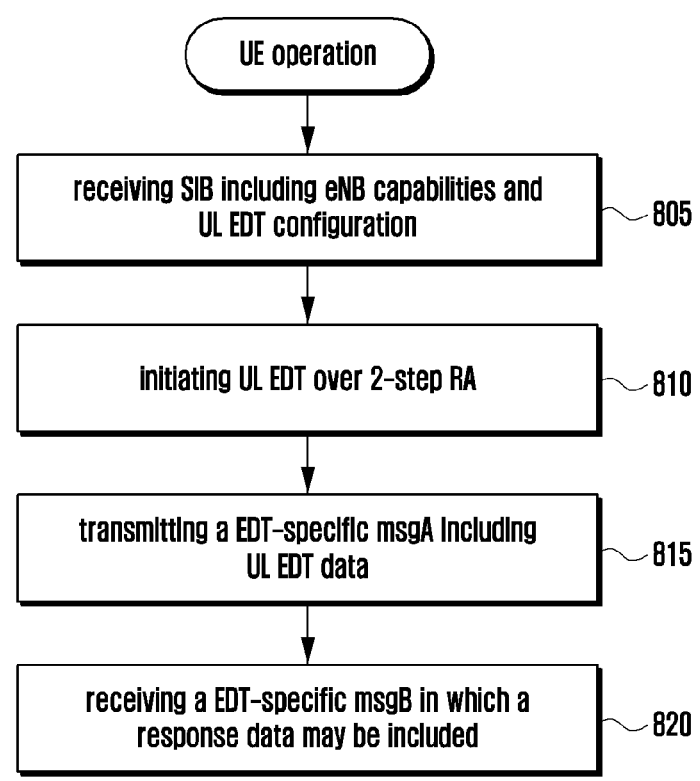
FIG. 8 is an example of a flowchart illustrating a UE operation according to an embodiment of the disclosure.

FIG. 8 is an example of a flowchart illustrating a UE operation according to an embodiment of the disclosure.

Referring to FIG. 8, at operation 805, a UE acquires information on whether to support two-step RA and CP/UP EDT and EDT-related configuration information from system information being broadcasted from a base station.

At operation 810, the UE initializes the two-step RA-based EDT for transmitting uplink user data according to a predetermined condition.

At operation 815, the UE configures and transmits EDT specific msgA. The msgA stores the user data.

At operation 820, the UE receives EDT specific msgB. The msgB may store downlink user data for the UE.

Figure 9:
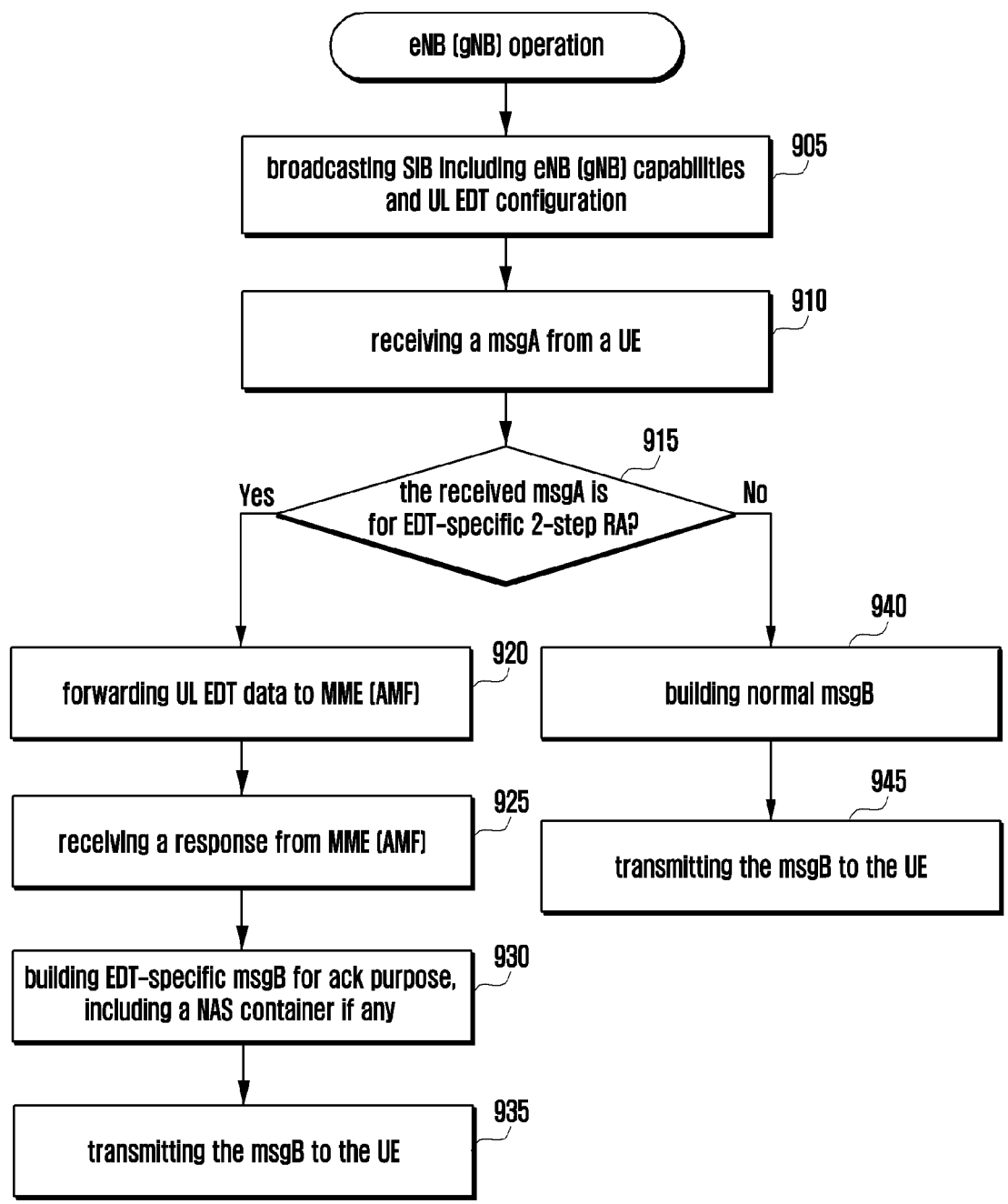
FIG. 9 is an example of a flowchart illustrating a base station operation according to an embodiment of the disclosure.

FIG. 9 is an example of a flowchart illustrating a base station operation according to an embodiment of the disclosure.

Referring to FIG. 9, at operation 905, a base station broadcasts information on whether to support two-step RA and CP/UP EDT and EDT-related configuration information.

At operation 910, the base station receives msgA from a specific UE.

At operation 915, the base station determines whether the msgA is for the purpose of EDT. If an EDT-dedicated preamble or sequence is stored in the msgA, the base station identifies this as an EDT-specific two-step RA. Alternatively, if a NAS container (NAS message) or DTCH is stored in the msgA, the base station identifies this as the EDT-specific two-step RA.

If the msgA received at operation 915 is the msgA for the EDT, the base station, at operation 920, forwards the user data stored in the msgA to an MME (or AMF) or S-GW. That is, the user data stored in the NAS container is transmitted to the MME, and the user data stored in the DTCH is transmitted to the S-GW.

At operation 925, the base station receives a response message from the MME. The base station may receive downlink user data from the MME or S-GW. The transmission subject matches a network entity (MME or S-GW) having received the uplink data.

At operation 930, the base station configures EDT specific msgB. If there is the received downlink user data, the base station includes the NAS container or DTCH storing the downlink user data in the msgB.

At operation 935, the base station transmits the configured msgB to the UE.

If the msgA received at operation 915 is not the msgA for the EDT, the base station configures a general msgB at operation 940. The configuration information of the general msgB and the EDT-specific msgB has already been described.

At operation 945, the base station transmits the configured msgB to the UE.

Figure 10:
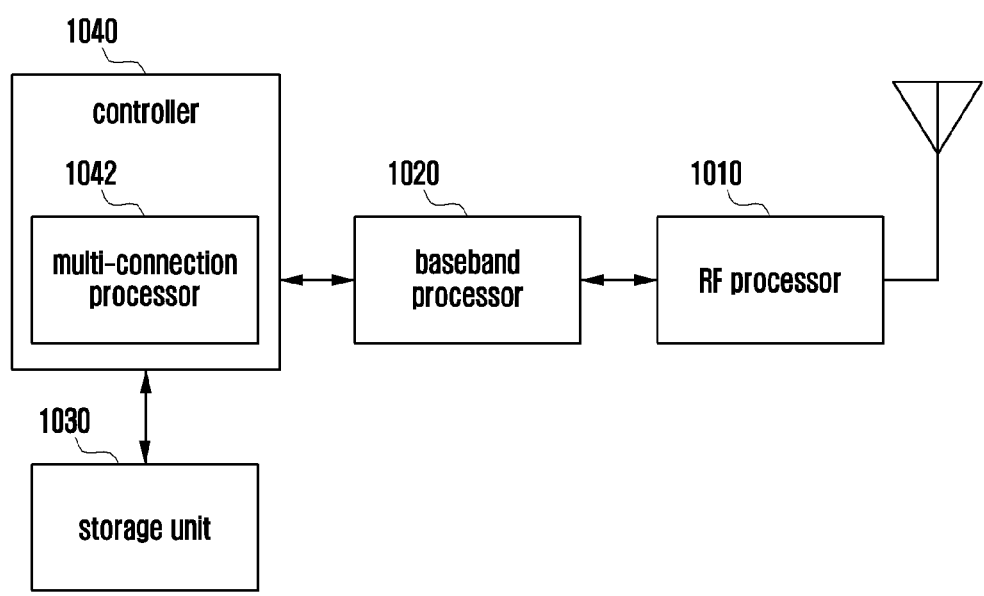
FIG. 10 is a block diagram illustrating the configuration of a UE according to an embodiment of the disclosure.

FIG. 10 is a block diagram illustrating the configuration of a terminal according to an embodiment of the disclosure.

Referring to FIG. 10, the terminal includes a radio frequency (RF) processor 1010, a baseband processor 1020, a storage unit 1030, and a controller 1040.

The RF processor 1010 performs a function for transmitting and receiving a signal on a radio channel, such as signal band conversion and amplification. That is, the RF processor 1010 performs up-conversion of a baseband signal provided from the baseband processor 1020 into an RF-band signal to transmit the converted signal through an antenna, and performs down-conversion of the RF-band signal received through the antenna into a baseband signal. For example, the RF processor 1010 may include a transmission filter, a reception filter, an amplifier, a mixer, an oscillator, a digital-to-analog converter (DAC), and an analog-to-digital converter (ADC). Although only one antenna is illustrated in FIG. 10, the terminal may be provided with a plurality of antennas. Further, the RF processor 1010 may include a plurality of RF chains. Further, the RF processor 1010 may perform beamforming. For the beamforming, the RF processor 1010 may adjust phases and sizes of signals transmitted or received through the plurality of antennas or antenna elements. Further, the RF processor 1010 may perform MIMO, and may receive several layers during performing of the MIMO operation.

The baseband processor 1020 performs a conversion function between a baseband signal and a bit string in accordance with the physical layer standard of the system. For example, during data transmission, the baseband processor 1020 generates complex symbols by encoding and modulating a transmitted bit string. Further, during data reception, the baseband processor 1020 restores a received bit string by demodulating and decoding the baseband signal provided from the RF processor 1010. For example, in case of following an orthogonal frequency division multiplexing (OFDM) method, during data transmission, the baseband processor 1020 generates complex symbols by encoding and modulating a transmitted bit string, performs mapping of the complex symbols onto subcarriers, and then configures OFDM symbols through the inverse fast Fourier transform (IFFT) operation and cyclic prefix (CP) insertion. Further, during data reception, the baseband processor 1020 divides the baseband signal being provided from the RF processor 1010 in the unit of OFDM symbols, restores the signals mapped onto the subcarriers through the fast Fourier transform (FFT) operation, and then restores the received bit string through demodulation and decoding.

The baseband processor 1020 and the RF processor 1010 transmit and receive the signals as described above. Accordingly, the baseband processor 1020 and the RF processor 1010 may be called a transmitter, a receiver, a transceiver, or a communication unit. Further, in order to support different radio access technologies, at least one of the baseband processor 1020 and the RF processor 1010 may include a plurality of communication modules. Further, in order to process signals of different frequency bands, at least one of the baseband processor 1020 and the RF processor 1010 may include different communication modules. For example, the different radio access technologies may include a wireless LAN (e.g., IEEE 802.11) and a cellular network (e.g., LTE). Further, the different frequency bands may include super high frequency (SHF) (e.g., 2.NR Hz or NR Hz) band and millimeter wave (e.g., 60 GHz) band.

The storage unit 1030 stores therein a basic program for an operation of the terminal, application programs, and data of configuration information. Further, the storage unit 1030 provides stored data in accordance with a request from the controller 1040.

The controller 1040 controls the overall operation of the terminal. For example, the controller 1040 transmits and receives signals through the baseband processor 1020 and the RF processor 1010. Further, the controller 1040 records or reads data in or from the storage unit 1030. For this, the controller 1040 may include at least one processor. For example, the controller 1040 may include a communication processor (CP) performing a control for communication and an application processor (AP) controlling a higher layer, such as an application program.

Figure 11:
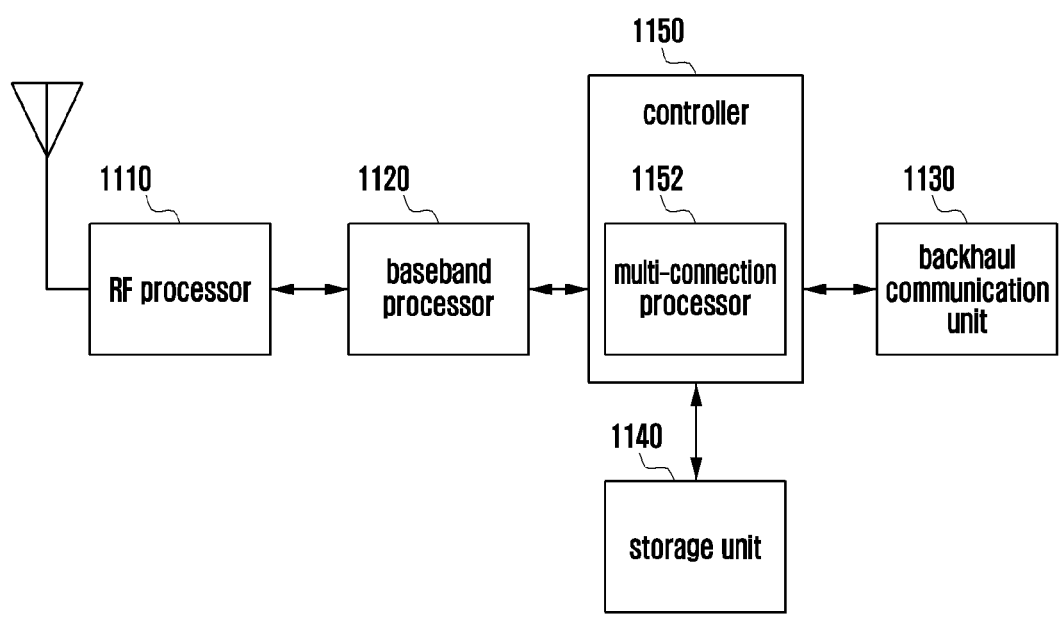
FIG. 11 is a block diagram illustrating the configuration of a base station according to an embodiment of the disclosure.

FIG. 11 is a block diagram illustrating the configuration of a base station according to an embodiment of the disclosure.

Referring to FIG. 11, a base station is configured to include an RF processor 1110, a baseband processor 1120, a backhaul communication unit 1130, a storage unit 1140, and a controller 1150.

The RF processor 1110 performs a function for transmitting and receiving a signal on a radio channel, such as signal band conversion and amplification. That is, the RF processor 1110 performs up-conversion of a baseband signal provided from the baseband processor 1120 into an RF-band signal to transmit the converted signal through an antenna, and performs down-conversion of the RF-band signal received through the antenna into a baseband signal. For example, the RF processor 1110 may include a transmission filter, a reception filter, an amplifier, a mixer, an oscillator, a DAC, and an ADC. Although only one antenna is illustrated in FIG. 11, the base station may be provided with a plurality of antennas. Further, the RF processor 1110 may include a plurality of RF chains. Further, the RF processor 1110 may perform beamforming. For the beamforming, the RF processor 1110 may adjust phases and sizes of signals transmitted or received through the plurality of antennas or antenna elements. The RF processor 1110 may perform down MIMO operation through transmission of one or more layers.

The baseband processor 1120 performs conversion function between a baseband signal and a bit string in accordance with the physical layer standard of the first radio access technology. For example, during data transmission, the baseband processor 1120 generates complex symbols by encoding and modulating a transmitted bit string. Further, during data reception, the baseband processor 1120 restores a received bit string by demodulating and decoding the baseband signal provided from the RF processor 1110. For example, in case of following an OFDM method, during data transmission, the baseband processor 1120 generates complex symbols by encoding and modulating a transmitted bit string, performs mapping of the complex symbols to subcarriers, and then configures OFDM symbols through the IFFT operation and CP insertion. Further, during data reception, the baseband processor 1120 divides the baseband signal provided from the RF processor 1110 in the unit of OFDM symbols, restores the signals mapped to the subcarriers through the FFT operation, and then restores the received bit string through demodulation and decoding. The baseband processor 1120 and the RF processor 1110 transmit and receive the signals as described above. Accordingly, the baseband processor 1120 and the RF processor 1110 may be called a transmitter, a receiver, a transceiver, a communication unit, or a wireless communication unit.

The backhaul communication unit 1130 provides an interface for performing communication with other nodes in the network. That is, the backhaul communication unit 1130 converts a bit string being transmitted from the base station to other nodes, for example, an auxiliary base station and a core network, into a physical signal, and converts the physical signal being received from other nodes into a bit string.

The storage unit 1140 stores therein a basic program for an operation of the base station, application programs, and data of configuration information. In particular, the storage unit 1140 may store information on a bearer allocated to the connected UE and the measurement result reported from the connected UE. Further, the storage unit 1140 may store information that becomes a basis of determination whether to provide or suspend a multi-connection to the UE. Further, the storage unit 1140 provides stored data in accordance with a request from the controller 1150.

The controller 1150 controls the overall operation of the base station. For example, the controller 1150 transmits and receives signals through the baseband processor 1120 and the RF processor 1110 or through the backhaul communication unit 1130. Further, the controller 1150 records or reads data in or from the storage unit 1140. For this, the controller 1150 may include at least one processor.

Figure 12:
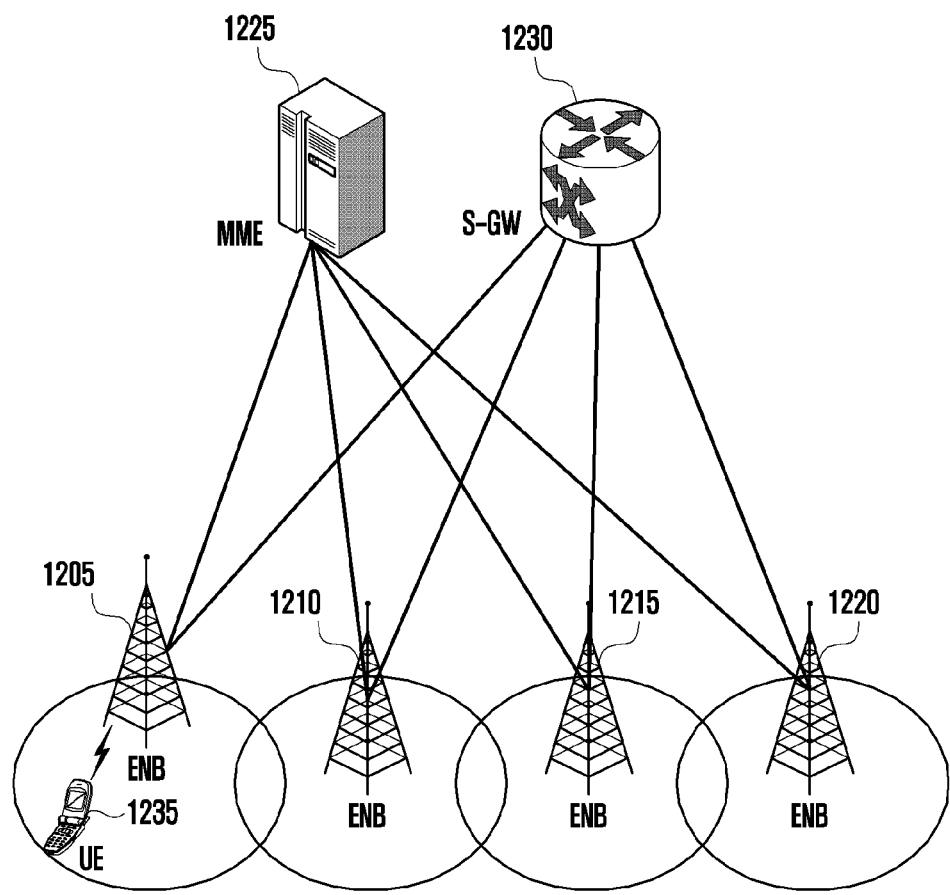
FIG. 12 is a block diagram illustrating the configuration of a next-generation mobile communication system according to an embodiment of the disclosure.

FIG. 12 is a diagram illustrating the structure of an LTE system according to an embodiment of the disclosure.

Referring to FIG. 12, as illustrated, a radio access network of an LTE system is composed of evolved node Bs (hereinafter referred to as "ENBs", "node Bs", or "base stations") 1205, 1210, 1215, and 1220, a mobility management entity (MME) 1225, and a serving-gateway (S-GW) 1230. User equipment (hereinafter referred to as "UE" or "terminal") 1235 accesses an external network through the ENBs 1205 to 1220 and the S-GW 1230.

In FIG. 12, the ENBs 1205 to 1220 correspond to existing node Bs of a UMTS. The ENBs 1205 to 1220 are connected to the UE 1235 on a radio channel, and play more complicated roles than those of the existing node Bs. In the LTE system, since all user traffics including a real-time service, such as a voice over IP (VoIP) through an Internet protocol, are serviced on shared channels, entities performing scheduling through gathering of state information, such as a buffer state, an available transmission power state, and a channel state of UEs 1235, are necessary, and the ENBs 1205 to 1220 take charge of this. In general, one ENB 1205 to 1220 controls a plurality of cells. For example, in order to implement a transmission speed of 100 Mbps, the LTE system uses, for example, orthogonal frequency division multiplexing (hereinafter referred to as "OFDM") as a radio access technology in a bandwidth of 20 MHz. Further, the LTE system adopts an adaptive modulation & coding (hereinafter referred to as "AMC") scheme that determines a modulation scheme and a channel coding rate to match the channel state of the UE 1235. The S-GW 1230 is an entity that provides a data bearer, and generates or removes the data bearer under the control of the MME 1225. The MME 1225 is an entity that takes charge of not only a mobility management function of the UE 1235 but also various kinds of control functions, and is connected to the plurality of base stations 1205 to 1220.

Figure 13:
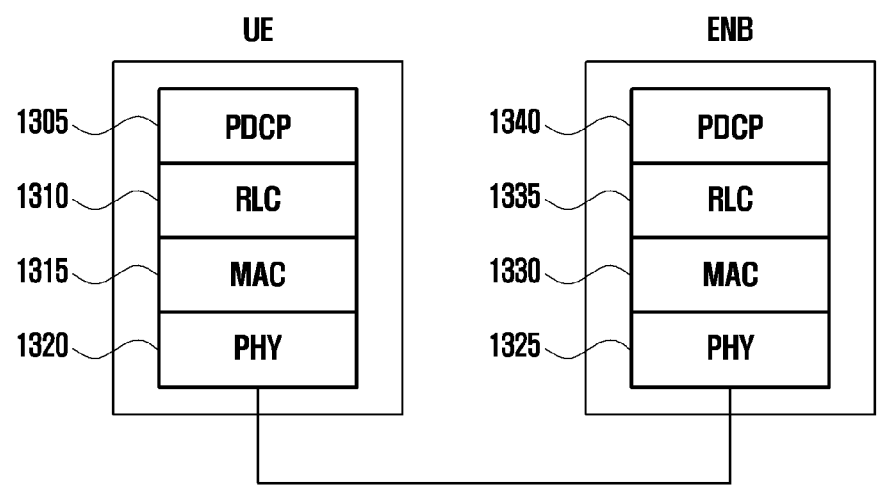
FIG. 13 is a diagram illustrating a radio protocol structure in an LTE system according to an embodiment of the disclosure.

FIG. 13 is a diagram illustrating a radio protocol structure in an LTE system according to an embodiment of the disclosure.

Referring to FIG. 13, in UE or an ENB, a radio protocol of an LTE system is composed of a packet data convergence protocol (PDCP) 1305 or 1340, a radio link control (RLC) 1310 or 1335, and a medium access control (MAC) 1315 or 1330. The packet data convergence protocol (PDCP) 1305 or 1340 takes charge of IP header compression/decompression operations, and the radio link control (RLC) 1310 or 1335 performs an ARQ operation or the like by reconfiguring a PDCP packet data unit (PDU) with a proper size. The MAC 1315 or 1330 is connected to several RLC layer devices configured in one UE, and performs multiplexing of RLC PDUs into MAC PDU and demultiplexing of the RLC PDUs from the MAC PDU. A physical layer 1320 or 1325 performs channel coding and modulation of higher layer data to configure and transmit OFDM symbols on a radio channel, or performs demodulation and channel decoding of the OFDM symbols received on the radio channel to transfer the demodulated and channel-decoded OFDM symbols to a higher layer.

Figure 14:
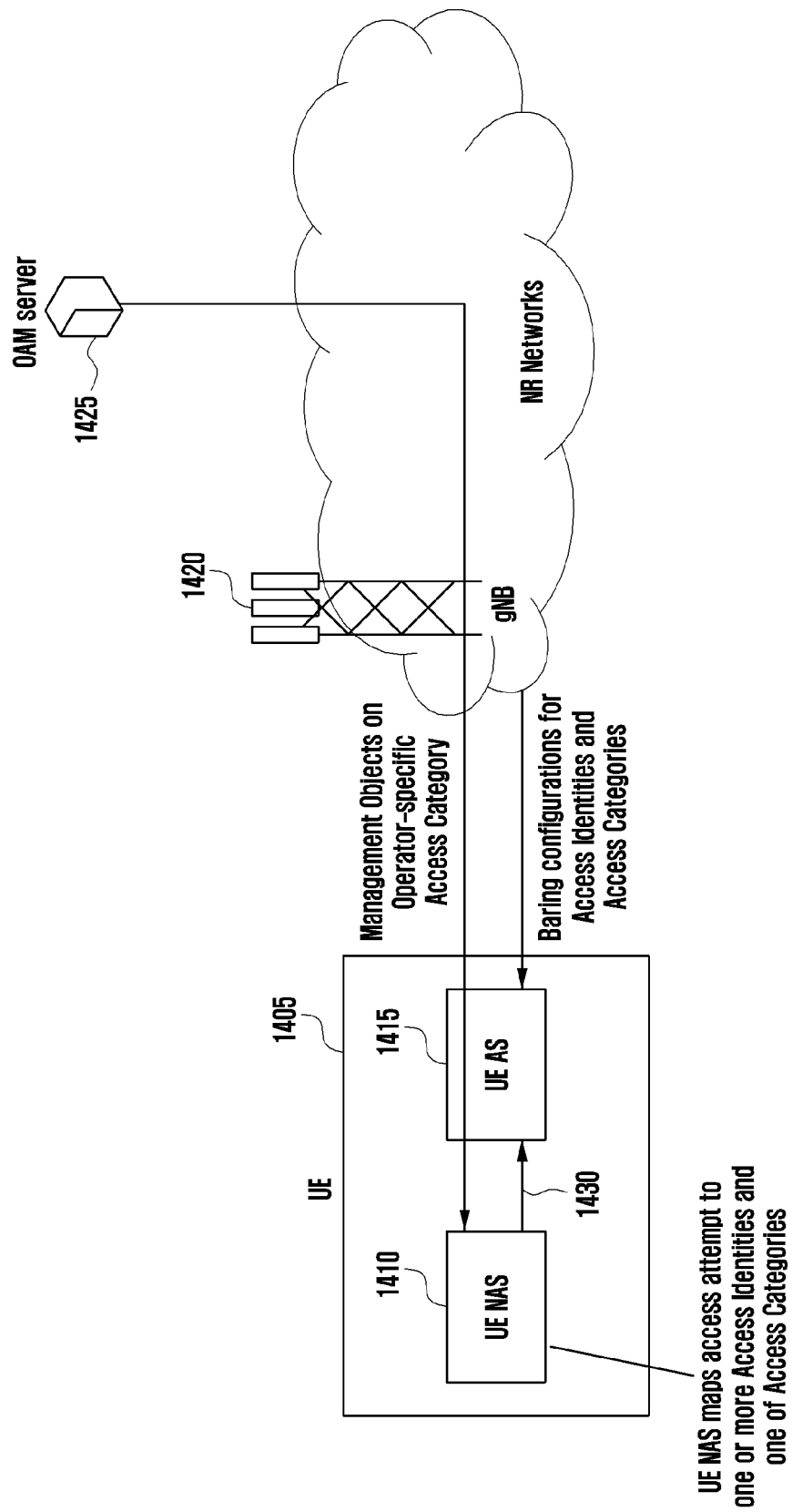
FIG. 14 is a diagram explaining a process in which a UE in a connected mode or in an inactive mode performs an access control according to an embodiment of the disclosure.

FIG. 14 is a diagram explaining a process of performing a UE access control according to an embodiment of the disclosure.

An access identity is indication information defined in 3GPP, i.e., specified in the standard document. The access identity is used to indicate a specific access as in Table 2 below. Mainly, the access identity indicates accesses classified into access classes 11 to 15, multimedia priority service (MPS), and mission critical service (MCS). The access classes 11 to 15 indicate accesses for business associates only or for public use.

TABLE 2

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |

TABLE 2-continued

| Access Identity number | UE configuration |
|---|---|
| 14 (NOTE 3) | Access Class 14 is configured in the UE. |
| 15 (NOTE 3) | Access Class 15 is configured in the UE. |

(NOTE 1):
Access Identity 1 is used to provide overrides according to the subscription information in UEs configured for MPS. The subscription information defines whether an override applies to UEs within one of the following categories:
a) UEs that are configured for MPS;
b) UEs that are configured for MPS and are in the PLMN listed as most preferred PLMN of the country where the UE is roaming in the operator-defined PLMN selector list or in their HPLMN or in a PLMN that is equivalent to their HPLMN;
c) UEs that are configured for MPS and are in their HPLMN or in a PLMN that is equivalent to it.
(NOTE 2):
Access Identity 2 is used to provide overrides according to the subscription information in UEs configured for MCS. The subscription information defines whether an override applies to UEs within one of the following categories:
a) UEs that are configured for MCS;
b) UEs that are configured for MCS and are in the PLMN listed as most preferred PLMN of the country where the UE is roaming in the operator-defined PLMN selector list or in their HPLMN or in a PLMN that is equivalent to their HPLMN;
c) UEs that are configured for MCS and are in their HPLMN or in a PLMN that is equivalent to it.
(NOTE 3):
Access Identifies 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country of the MCC part of the IMSI.

Access category is divided into two kinds. One kind is a standardized access category. The category is a category defined at a RAN level, i.e., specified in the standard document. Accordingly, the same standardized access category is applied to different operators. In the disclosure, a category corresponding to emergency belongs to the standardized access category. All accesses correspond to at least one of the standardized access categories. Further, another kind is an operator-specific (non-standardized) access category. The category is defined out of 3GPP, and is not specified in the standard document. Accordingly, one operator-specific access category has different meanings with respect to the operators. A certain access triggered in UE NAS 1410 may not be mapped onto the operator-specific access category. The category is greatly different from the exiting ACDC on the point that the category may correspond to not only an application but also other elements excluding the application, such as service type, call type, UE type, user group, signaling type, slice type, or a combination of the above elements. That is, it is possible to control whether to approve accesses belonging to another element. The access category is used to indicate a specific access as in Table 3 below. The access category nos. 0 to 7 are used to indicate the standardized access category, and the access category nos. 32 to 63 are used to indicate the operator-specific access category.

TABLE 3

| Access Category number | Conditions related to UE | Type of access attempt |
|---|---|---|
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |

TABLE 3-continued

| Access Category number | Conditions related to UE | Type of access attempt |
| --- | --- | --- |
| 8-31 | | Reserved standardized Access Categories |
| 32-63 (NOTE 2) | All | Based on operator classification |

(NOTE 1):
The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.
(NOTE 2):
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.

An operator server 1425 provides information (management object (MO)) about the operator-specific access category information to the UE NAS 1410 through NAS signaling or application level data transmission. The information represents which element, such as an application, each operator-specific access category corresponds to. For example, it may be specified in the information that the access category no. 32 corresponds to an access corresponding to a facebook application. Using the system information, the base station 1420 provides UEs 1405 with a category list for providing barring configuration information and the barring configuration information corresponding to each category. The UE 1405 includes logical blocks of NAS 1410 and AS 1415.

The UE NAS 1410 maps the triggered access onto the one or more access identities and the one access category in accordance with a predetermined rule. The mapping operation is performed in all RRC states, i.e., in the connected mode (RRC_CONNECTED), idle mode (RRC_IDLE), and inactive mode (RRC_INACTIVE). The characteristic of the respective RRC states are listed as follows.
  RRC_IDLE:
  A UE specific DRX may be configured by upper layers;
  UE controlled mobility based on network configuration;
  The UE:
  Monitors a Paging channel;
  Performs neighboring cell measurements and cell (re-) selection;
  Acquires system information.
  RRC_INACTIVE:
  A UE specific DRX may be configured by upper layers or by RRC layer;
  UE controlled mobility based on network configuration;
  The UE stores the AS context;
  The UE:
  Monitors a Paging channel;
  Performs neighboring cell measurements and cell (re-) selection;
  Performs RAN-based notification area updates when moving outside the RAN-based notification area;
  Acquires system information.
  RRC_CONNECTED:
  The UE stores the AS context.
  Transfer of unicast data to/from UE.
  At lower layers, the UE may be configured with a UE specific DRX;
  For UEs supporting CA, use of one or more SCells, aggregated with the SpCell, for increased bandwidth;
  For UEs supporting DC, use of one SCG, aggregated with the MCG, for increased bandwidth;
  Network controlled mobility, i.e. handover within NR and to/from E-UTRAN.
  The UE:
  Monitors a Paging channel;
  Monitors control channels associated with the shared data channel to determine if data is scheduled for it;
  Provides channel quality and feedback information;
  Performs neighboring cell measurements and measurement reporting;
  Acquires system information.

As another option, if one access can be mapped to one standardized access category in the access category mapping, the access may be additionally mapped to one operator-specific access category. The UE NAS 1410 transfers, to the UE AS 1415, the mapped access identity and the access category together with the service request.

If the access identity or access category information is provided from the UE NAS 1410 together with a message being received from the UE NAS 1410 in all RRC states, the UE AS 1415 performs a barring check operation for determining whether a radio access caused by the message is allowed before performing the radio access. If the radio access is allowed in the barring check operation, the UE AS 1415 requests RRC connection configuration from the network. As an example, the NAS 1410 of the UE in the connected mode or in the inactive mode transmits the access identity and the access category to the UE AS 1415 due to the cause below (1430). In the disclosure, the following causes are commonly called "new session request".
  new MINITEL voice or video session
  sending of SMS (SMS over IP, or SMS over NAS)
  new PDU session establishment
  existing PDU session modification
  service request to re-establish the user plane for an existing PDU session In contrast, during the service request, the NAS 1410 of the UE in the idle mode transmits the access identity and the access category to the UE AS 1415.

The UE AS 1415 determines whether the access triggered by the UE NAS 1410 is allowed using the barring configuration information (barring check).

An operator may desire to allow only a specific service type among the accesses corresponding to at least one of access classes 11 to 15. Whether to allow the access may be determined in accordance with attributes to distinguish the accesses belonging to access classes 11, 12, 13, 14, and 15 indicated by the access identities through the access categories. The barring configuration information of the access category is composed of ac-barringFactor and ac-barringTime. Information on the access-allowed access identity is indicated by one bitmap by access categories. If the triggered access belongs to the access-allowed access identity, the access is attempted through omission of the barring check using the ac-barringFactor.

The disclosure proposes a technology to transmit and receive user data with a predetermined small size in a random access process with a base station in a state where a UE in an idle mode (RRC_Idle) or in an inactive mode (RRC_Inactive) is not switched to a connected mode (RRC_Connected) in a mobile communication system. In the disclosure, the technology is called early data transmission (EDT). In particular, the disclosure proposes a method in which an uplink UE transmits user data to an LTE base station (mobile originated (MO)-initiated) using the EDT technology. In the disclosure, the uplink transmission is called uplink early data transmission (UL EDT). In the disclosure, a case where the LTE base station is connected to the MME or 5GC is considered. If the LTE base station is connected to the 5GC, NR access control, QoS-based bearer control, and slice-based service providing become possible. That is, even the LTE base station can adapt a partial NR function. The disclosure proposes UL EDT in consideration of the NR access control. A first embodiment corresponds to a case where a UE NAS determines UL EDT trigger, and a second embodiment corresponds to a case where the UE AS determines the UL EDT trigger.

Figure 15A:
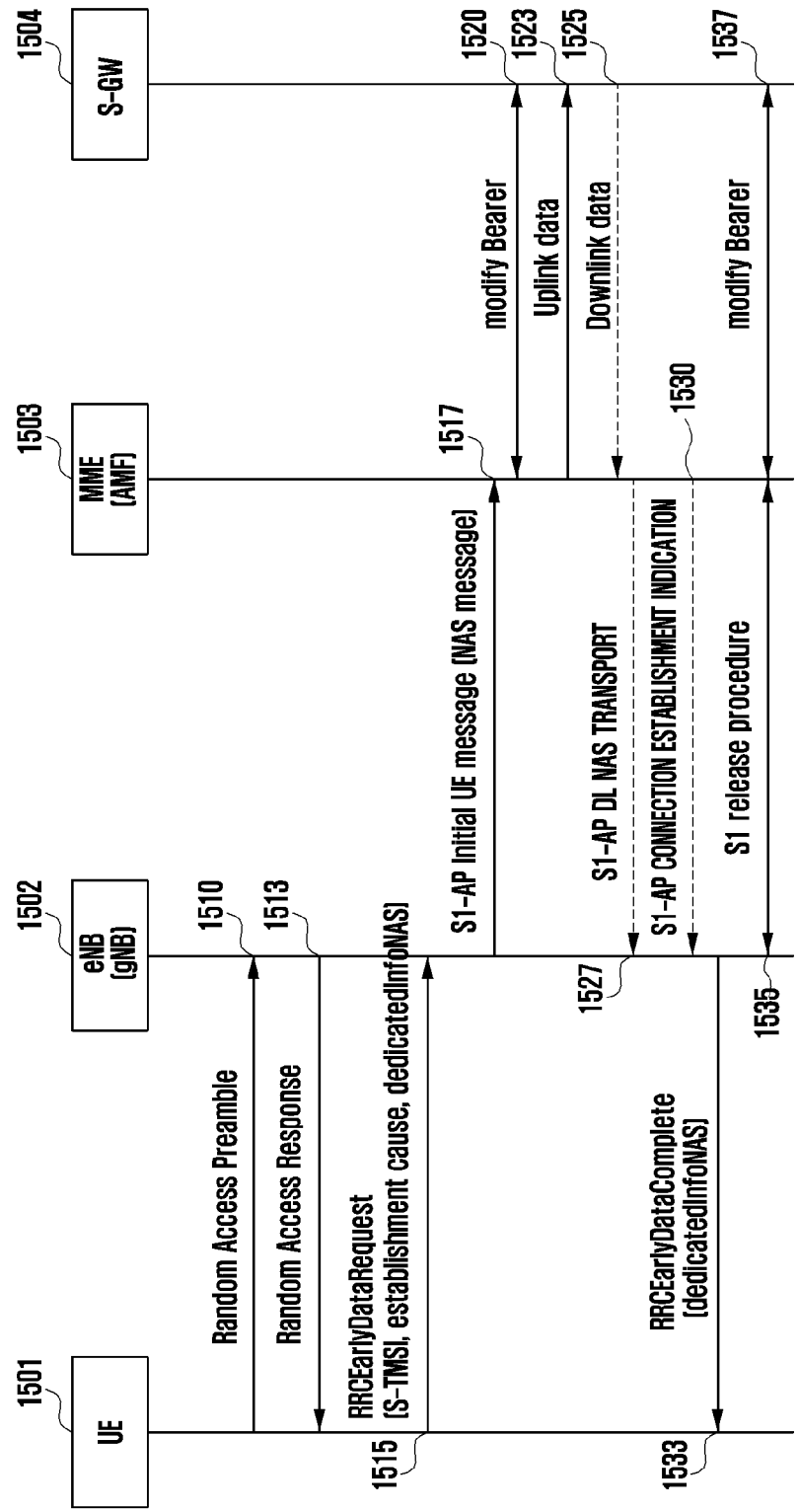
FIGS. 15A and 15B are flowcharts illustrating an uplink EDT operation according to an embodiment of the disclosure.
Figure 15B:
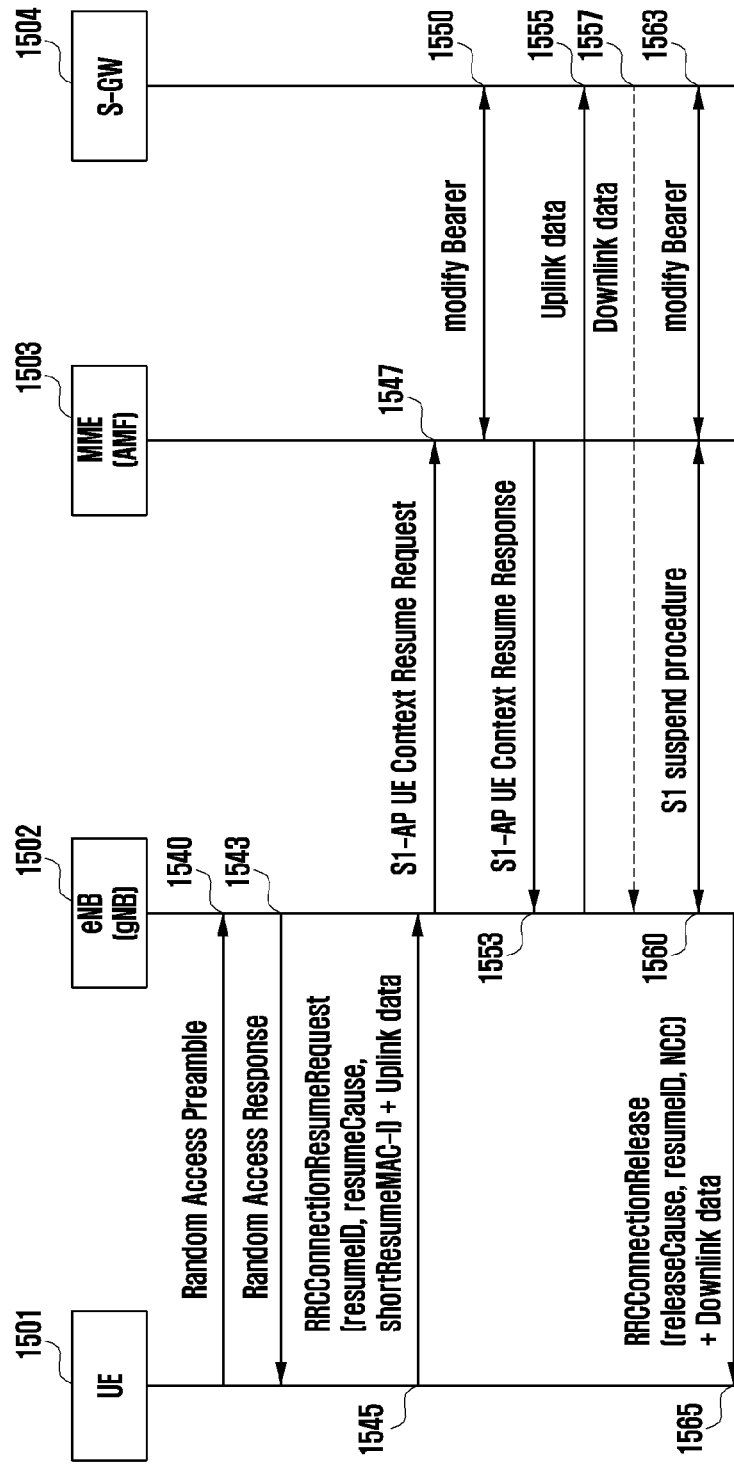

FIGS. 15A and 15B are flowcharts illustrating an uplink EDT operation in a four-step random access process according to an embodiment of the disclosure.

As a method for transmitting user data to a base station in a four-step random access process, control plane (CP) EDT and user plane (UP) EDT exist.

FIG. 15A is a flowchart illustrating a CP EDT operation. The CP EDT has the following features.

- Uplink user data may be stored in a NAS container of an RRCEarlyDataRequest message to be transmitted, which is one RRC message belonging to CCCH.
- Selectively, downlink user data may be stored in a NAS container of an RRCEarlyDataComplete message to be transmitted, which is one RRC message belonging to the CCCH.
- In the above process, switchover to an RRC connected mode does not occur.

Specifically, referring to FIG. 15A, if there is a request for uplink user data transmission from a higher layer of a UE in a connection establishment request process, the UE 1501 initializes the EDT process according to a predetermined condition, and selects one random access preamble configured for the EDT process (operation 1510).

A base station 1502 transmits a random access response message (RAR) for the preamble to the UE 1501 (operation 1513).

The UE 1501 stores the NAS container (NAS message) including the user data in the RRCEarlyDataRequest that is one RRC message belonging to the CCCH, and transmits the message to the base station 1502 (operation 1515).

The base station 1502 stores the NAS container in S1-AP Initial UE message, and transmits the message to an MME (or AMF) 1503 (operation 1517). In this case, S1 connection is established. In the above process, the base station 1502 may indicate that this connection has been triggered by the EDT to the MME (or AMF) 1503.

The MME 1503 requests S-GW 1504 to reactivate an EPS bearer for the UE 1501 (operation 1520), and transmits the user data to the S-GW 1504 (operation 1523). If downlink user data for the UE 1501 is effective, the S-GW 1504 transmits the downlink user data to the MME 1503 (operation 1525).

The MME 1503 having received the downlink user data may transmit the data to the base station 1502 through a DL NAS Transport process (operation 1527). Alternatively, the MME 1503 may trigger an S1-AP Connection Establishment Indication process (operation 1530). The base station 1502 stores the downlink user data in the NAS container of the RRCEarlyDataComplete message that is one RRC message belonging to the CCCH, and transmits the message to the UE 1501 (operation 1533). If the MME 1503 has not provided the downlink user data, the base station 1502 transmits the RRCEarlyDateComplete message to the UE 1501 without the downlink user data.

Thereafter, the S1 connection is released (operation 1535), and the EPS bearer is inactivated (operation 1537).

If additional data transmission/reception is necessary, the MME 1503 or the base station 1502 may switch the UE 1501 to the connected mode. If the switchover is triggered, the base station 1502 transmits the RRCConnectionSetup message to the UE 1501 instead of the RRCEarlyDataComplete message. This means that the conventional RRC connection establishment process has been triggered.

FIG. 15B is a flowchart illustrating an UP EDT operation. The UP EDT has the following features.

- In order to trigger the UP EDT, the UE 1501 should be in an inactive mode through reception of an RRCConnectionRelease (or RRCRelease) message indicating that the UE 1501 is previously switched to the inactive mode. In this case, through the RRC message, NextHopChainingCount information is provided to the UE 1501.
- The uplink user data is transmitted on DTCH, and is multiplexed into RRCConnectionResumeRequest that is one RRC message belonging to the CCCH. That is, the RRC message and the DTCH are stored in the msg3 together.
- Selectively, the downlink user data is transmitted on the DTCH, and is multiplexed into the RRCConnectionRelease message that is one RRC message belonging to DCCH. That is, the RRC message and the DTCH are stored in msg4 together.
- For the RRCConnectionResumeRequest message, short resume MAC-I is reused as an authentication token, and is derived using an integrity key used in the previous connection.
- The uplink/downlink user data is ciphered. Security keys being applied are derived using the NextHopChainingCount provided in the RRCConnectionRelease message in the previous connection.
- The RRCConnectionRelease message in the msg4 has integrity and is ciphered using newly derived security keys.
- In the above process, switchover to the RRC connected mode does not occur.

Specifically, referring to FIG. 15B, if there is a request for uplink user data transmission from a higher layer of a UE in a connection establishment request process, the UE 1501 initializes the EDT process according to a predetermined condition, and selects one random access preamble configured for the EDT process (operation 1540).

A base station 1502 transmits a random access response message (RAR) for the preamble to the UE 1501 (operation 1543).

The UE 1501 transmits, to the base station 1502, RRC-ConnectionResumeRequest including resume ID, establishment cause, and authentication token (operation 1545). The UE 1501 restarts all SRBs and DRBs, derives new security keys using NextHopChainingCount having been included in the RRCConnectionRelease message received through the previous connection, and reestablishes AS security. The uplink user data is ciphered and transmitted through DTCH, and is multiplexed into the RRCConnectionResumeRequest that is one RRC message belonging to CCCH. The base station 1502 triggers an S1-AP Context Resume process (operation 1547), and restarts SI connection. Further, an MME 1503 reactivates an S1-U bearer.

The MME 1503 requests S-GW 1504 to reactivate the S1-U bearer for the UE 1501 (operation 1550). The MME 1503 confirms UE context resumption to the base station 1502 (operation 1553).

The base station 1502 having received the uplink user data from the UE 1501 transmits the uplink user data to the S-GW 1504 (operation 1555).

If downlink user data for the UE 1501 is effective, the S-GW 1504 transmits the downlink user data to the base station 1502 (operation 1557).

If there is not additional data from the S-GW 1504, the base station 1502 may trigger suspension (operation 1560) for the SI connection and inactivation of the S1-U bearer (operation 1563).

In order to switch the UE 1501 again to the inactive mode (RRC_Inactive), the base station 1502 transmits, to the UE 1501, the RRCConnectionRelease message including the release cause indicated as "rrc_Suspend", resume ID, NextHopChainingCount, and drb-ContinueROHC (operation 1565). The listed information is stored inside the UE 1501. If the downlink user data exists, the data is transmitted through DTCH, and is multiplexed into the RRCConnectionRelease message that is one RRC message belonging to the DCCH.

If additional data transmission/reception is necessary, the MME 1503 or the base station 1502 may switch the UE 1501 to the connected mode. If the switchover is triggered, the base station 1502 transmits the RRCConnectionResume message to the UE 1501 instead of the RRCConnectionRelease message. This means that the conventional RRC connection establishment process has been triggered. The data may be transmitted through the DTCH, and may be multiplexed into the RRCConnectionResume message that is one RRC message.

Figure 16:
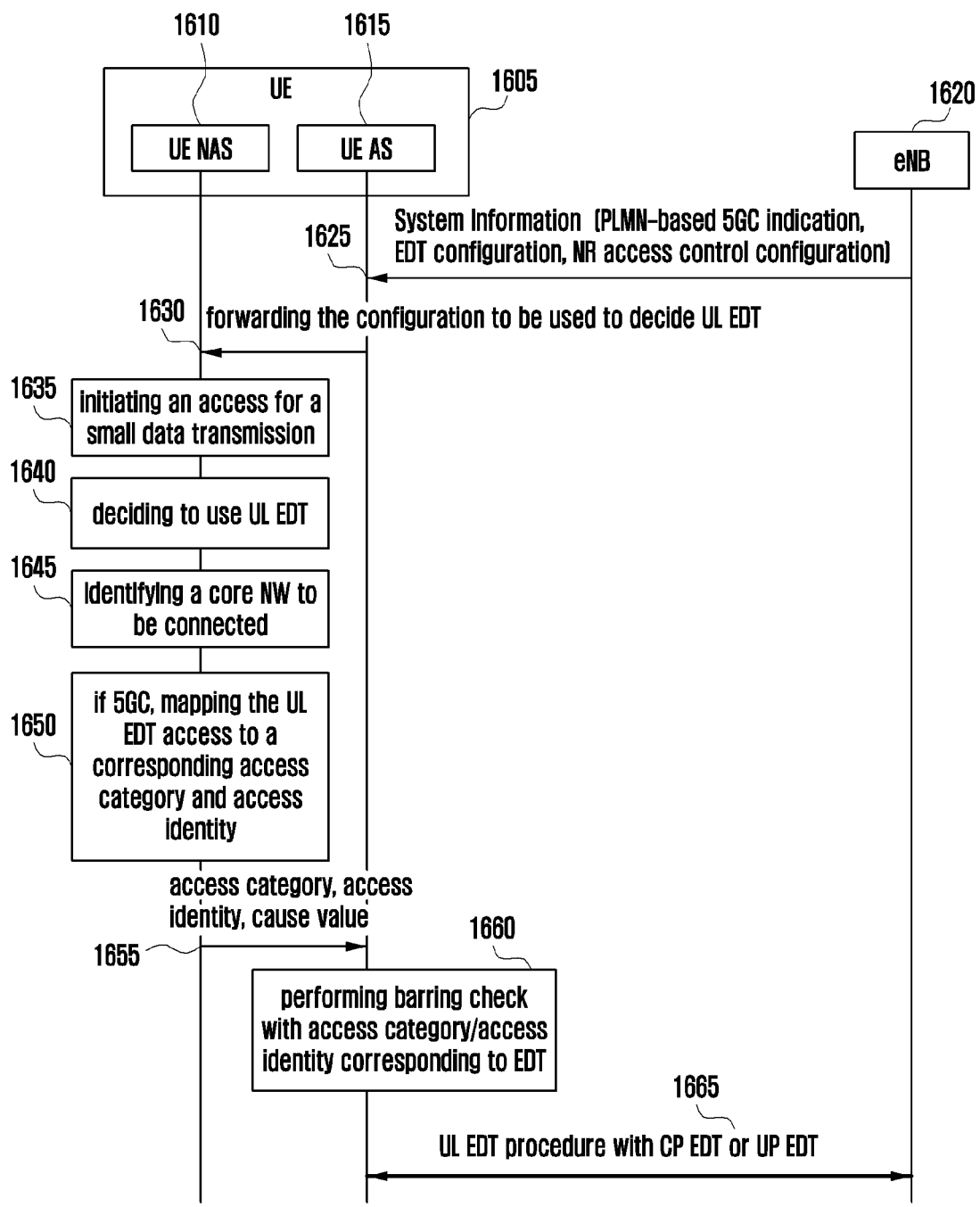
FIG. 16 is a flowchart illustrating a process in which a UE in a connected mode or in an inactive mode performs an access control in a first embodiment of the disclosure.

FIG. 16 is a flowchart illustrating a process in which a UE in a connected mode or in an inactive mode performs an access control in a first embodiment of the disclosure.

Referring to FIG. 16, a base station 1620 may store an indicator (indication is possible based on PLMN information) indicating being connected to 5GC, EDT configuration information, and NR barring configuration information in system information to be broadcasted (operation 1625). The EDT configuration information includes an indicator indicating whether to support CP EDT or UL EDT, and corresponds to maximum TBS information that can be transmitted through the EDT operation. NR barring configuration information is configuration information necessary to perform the barring check by access categories as described above.

A UE 1605 is composed of NAS 1610 and AS 1615. The NAS 1610 takes charge of processes that are not directly related to radio accesses, i.e., authentication, service request, and session management, whereas the AS 1615 takes charge of processes related to the radio accesses.

The UE AS 1615 having received the system information transfers, to the UE NAS 1610, information representing that the base station 1620 is connected to 5GC and information necessary to trigger the UL EDT (operation 1630). If a predetermined condition is satisfied, the UE NAS 1610 may trigger the UL EDT (operation 1640). As an example, if the UE 1605 and the base station 1620 can support the UL EDT and the size of the data is equal to or smaller than the configured TBS when user data intended to be transmitted is generated (operation 1635), the NAS 1610 triggers the UL EDT (operation 1640).

If the base station 1620 is connected to the 5GC (operation 1645), the NAS 1610 may apply the NR access control, and for this, it maps the triggered access onto one access category and access identity (operation 1650). In advance, the network provides management object information to the NAS 1610 using an application-level data message (OAM) or NAS message. The information represents which element, such as an application, each operator-specific access category corresponds to.

In order to determine which operator-specific category the triggered access is mapped to, the NAS 1610 uses the above information. The triggered access corresponds to a new MINITEL service (voice call and video call), SMS transmission, new PDU session establishment, and existing PDU session change. If the access is triggered, the NAS 1610 maps the triggered access onto the access identity and access category corresponding to the attribute of the access. The access may not be mapped onto any access identity, and may be mapped onto one or more access identities. Further, the access is necessarily mapped onto one access category. It is first confirmed whether the access is mapped onto the operator-specific access category provided from the management object. If the access is not mapped onto any operator-specific access category, the NAS 1610 maps the access onto the corresponding one of the standardized access categories. If the access can be mapped onto a plurality of access categories, the NAS 1610 performs mapping with priority in the order of the operator-specific access category and the standardized access category. In other words, if the access is not mapped onto any operator-specific access category, the NAS 1610 maps the access onto the corresponding one of the standardized access categories. In the mapping rule, standardized access category 0 and standardized access category 1 (emergency service) are excluded. That is, if the access can be mapped onto access categories 0 and 1, the NAS 1610 should preferentially map the access thereto.

In the first embodiment, it is featured that the NAS 1610 maps the UL EDT access onto a separate new access category or onto the existing standardized access category 1 (delay tolerant access) or the existing standardized access category 7 (MO data).

Option 1-1: The UE NAS 1610 maps the EDT access onto the access category for new UL EDT access only. The new access category belongs to the standardized access category. The base station 1620 broadcasts separate barring configuration information corresponding to the new access category through system information, and the UE AS 1615 performs the barring check based on the configuration information. In other words, the base station 1620 may control the UL EDT access discriminatorily from other accesses.

Option 1-2: The UE NAS 1610 maps the EDT access onto the existing standardized access category 1 (delay tolerant access) or the existing standardized access category 7 (MO data). The UE AS 1615 performs the barring check based on the barring configuration information corresponding to the existing standardized access category 1 (delay tolerant access) or the existing standardized access category 7.

Further, the NAS 1610 selects one cause value corresponding to the access and provides the selected cause value to the AS 1615. In the first embodiment, it is featured that the NAS 1610 maps the UL EDT access onto a separate new cause value (establishment cause value and resume cause value) or the delayTolerantAccess or MO data among the existing cause values. The usual cause value is used for the base station 1620 to determine whether to reject the access. Accordingly, to define the new cause value for the EDT access is to use the new cause value in case that the base station 1620 determines whether to reject the EDT access.

Option 2-1: The UE NAS 1610 maps the EDT access onto the cause value (edtAccess) for the new UL EDT access only.

Option 2-2: The UE NAS 1610 maps the EDT access onto the delayTolerantAccess or MO data among the existing cause values.

At option 2-2, in case of reusing the conventional cause value, if the base station 1620 receives a predetermined RRC message or DTCH including the uplink user data from the UE 1605 through msg3, the base station 1620 considers that the msg3 is related to the EDT operation based on the RRC message or DTCH, and determines access rejection.

The NAS 1610 transmits a new session request or Service Request to the AS 1615 together with the mapped access identity and access category, and the cause value (operation 1655). In the connected mode or inactive mode, the NAS 1610 transmits Service Request/new session request to the AS 1615, and in the idle mode, the NAS 1610 transmits the Service Request to the AS 1615. The AS 1615 receives and stores the barring configuration information from the system information being broadcasted by the network. An example of ASN.1 structure of the barring configuration information is as in Table 4 below, and the detailed explanation thereof will be made later.

The AS 1615 determines whether the access request is allowed using the access identity and access category information mapped by the NAS 1610 and the corresponding barring configuration information received from the network (operation 1660). In the disclosure, the operation of determining whether the access request is allowed is called barring check. The UE 1605 receives the system information including the access control configuration information, and stores the configuration information. The barring configuration information is provided by PLMNs and by access categories. BarringPerCatList IE is used to provide the barring configuration information of the access categories belonging to one PLMN. For this, PLMN id and the barring configuration information of the respective access categories are included in the IE in the form of a list. The barring configuration information by access categories includes an access category id (or index) indicating a specific access category, uac-BarringForAccessIdentity field, uac-BarringFactor field, and uac-Barringtime field. The above-mentioned barring check operation is as follows. First, respective bits constituting uac-BarringForAccessIdentityList correspond to one access identity, and if the bit value is indicated as "0", the access related to the access identity is allowed. If at least one of the corresponding bits in the uac-Barring ForAccessIdentity is "0" with respect to at least one of the mapped access identities, the access is allowed. If any one of the corresponding bits in the uac-Barring ForAccessIdentity is not "0" with respect to at least one of the mapped access identities, additional barring check to be described later is performed using additional uac-BarringFactor field. The uac-BarringFactor $\alpha$ is in the range of $0 \le \alpha < 1$. The UE AS 1615 derives one random value rand in the range of $0 \le rand < 1$, and if the random value is smaller than the uac-BarringFactor, the UE AS 1615 considers that the access is not prohibited, whereas otherwise, the UE AS 1615 considers that the access is prohibited. If it is deter-

TABLE 4

```
UAC-BarringPerPLMN-List ::=     SEQUENCE (SIZE (1.. maxPLMN)) OF UAC-BarringPerPLMN
UAC-BarringPerPLMN ::=          SEQUENCE {
    plmn-IdentityIndex              INTEGER (1..maxPLMN),
    uac-ACBarringListType           CHOICE{
        uac-ImplicitACBerringList       SEQUENCE (SIZE(maxAccessCat-1)) OF UAC-BarringInfoSetIndex,
        uac-ExplicitACBerringList       UAC-BarringPerCatList
    }
}
UAC-BarringPerCatList ::= SEQUENCE (SIZE (1..maxAccessCat-1)) OF UAC-BarringPerCat
UAC-BarringPerCat ::= SEQUENCE {
    accessCategory                  INTEGER (1..maxAccessCat-1),
    uac-barringInfoSetIndex         UAC-BarringInfoSetIndex
}
UAC-BarringInfoSetIndex ::=     INTEGER (1..maxBarringInfoSet)
UAC-BarringInfoSetList ::= SEQUENCE (SIZE(1..maxBarringInfoSet)) OF UAC-BarringInfoSet
UAC-BarringInfoSet ::= SEQUENCE {
    uac-BarringFactor               ENUMERATED {
                                        p00, p05, p10, p15, p20, p25, p30, p40,
                                        p50, p60, p70, p75, p80, p85, p90, p95},
    uac-BarringTime                 ENUMERATED {s4, s8, s16, s32, s64, s128, s256, s512},
    uac-BarringPerAccessIdentity    BIT STRING (SIZE(7))
}
``` mined that the access is prohibited, the UE AS 1615 delays an access attempt for a predetermined time derived using Equation 1 below. The UE AS 1615 drives a timer having the above time value. In the disclosure, the timer is called barring timer.

$$\text{"Tbarring"} = (0.7 + 0.6 * \text{rand}) * uac\text{-}BarringTime. \quad \text{Equation 1}$$

If the access is prohibited, the UE AS 1615 notifies the UE NAS 1610 of this. Further, if the derived predetermined time expires, the UE AS 1615 notifies the UE NAS 1610 that the access can be requested again (barring alleviation). From this time, the UE NAS 1610 may request the access again from the UE AS 1615.

If the service request is allowed in accordance with the predetermined rule, the AS 1615 performs a random access operation for the EDT (operation 1665).

Figure 17:
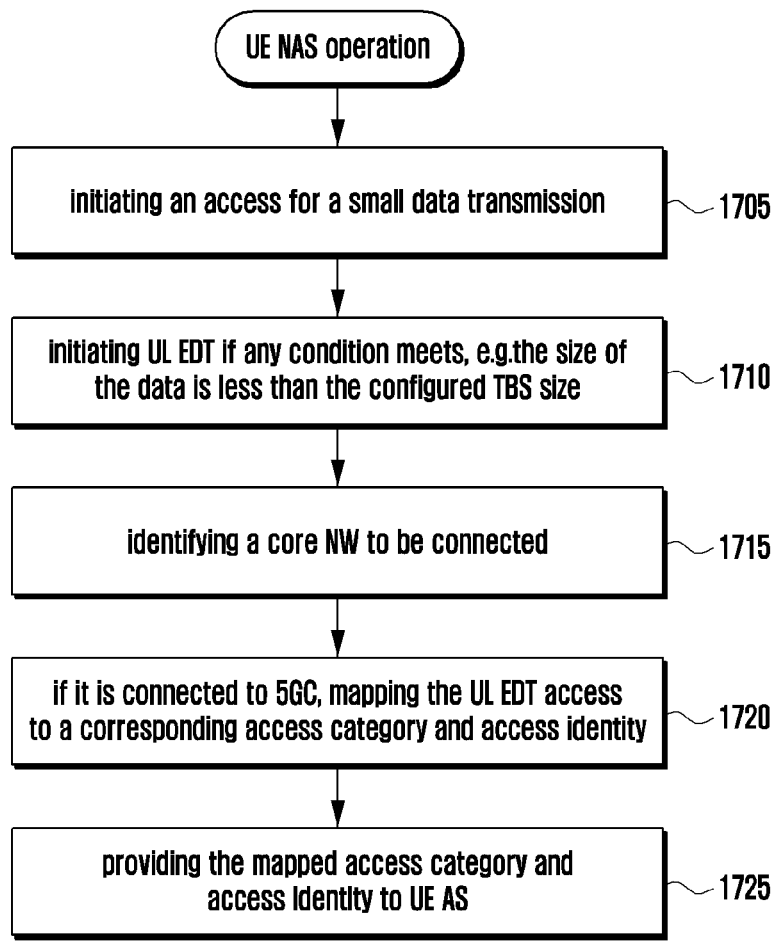
FIG. 17 is a flowchart illustrating a UE NAS operation in a first embodiment of the disclosure.

FIG. 17 is a flowchart illustrating a UE NAS operation in a first embodiment of the disclosure.

Referring to FIG. 17, the UE NAS, at operation 1705, initializes an access for transmitting user data of a small size.

At operation 1710, if a predetermined condition is satisfied, the UE NAS determines to transmit the user data through an EDT operation. As an example, the predetermined condition corresponds to a case in which a serving base station supports an EDT operation, and the size of the user data is equal to or smaller than the maximum TBS size transmittable by the EDT provided by the base station.

At operation 1715, the UE NAS confirms a core network to perform the EDT operation. As an example, if the serving base station is connected to the 5GC, and the UE has previously performed a registration process in the 5GC, the UE NAS considers the connection to the 5GC, and performs the following operation. If the serving base station is not connected to the 5GC, or the UE has not previously performed a registration process in the 5GC, the UE NAS considers the connection to the MME, and performs the following operation.

At operation 1720, if the base station is connected to the 5GC (and the UE has previously completed the registration process in the 5GC), the UE NAS maps the access onto one access category and access identity in accordance with the predetermined rule. Further, the UE NAS determines the cause value corresponding to the access. In the disclosure, the new access category for the EDT is mapped, or the EDT access is mapped onto the existing access category 1 or access category 7.

At operation 1725, the UE NAS provides the determined access category, access identity, and cause value to the UE AS.

Figure 18:
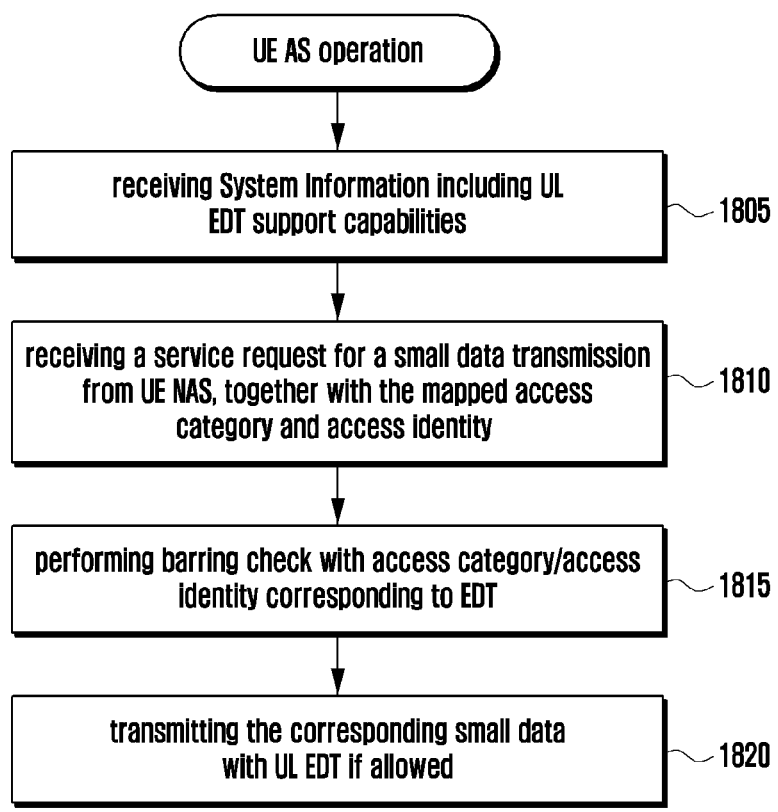
FIG. 18 is a flowchart illustrating a UE AS operation in a first embodiment of the disclosure.

FIG. 18 is a flowchart illustrating a UE AS operation in a first embodiment of the disclosure.

Referring to FIG. 18, the UE AS, at operation 1805, receives, from the base station, system information including an indicator (indication is possible based on PLMN information) indicating being connected to 5GC, EDT configuration information, and NR barring configuration information.

At operation 1810, the UE AS receives, from the UE NAS, the determined access category, access identity, and cause value.

At operation 1815, the UE AS performs the barring check by applying the provided NR barring configuration information, access category, and access identity.

At operation 1820, if it is judged that the EDT access is allowed in the barring check, the UE AS performs the random access for the EDT operation. In the random access process, the user data is transmitted. The cause value determined by the UE NAS is stored in the RRCEarlyDataRequest or RRCConnectionResumeRequest message of the msg3.

Figure 19:
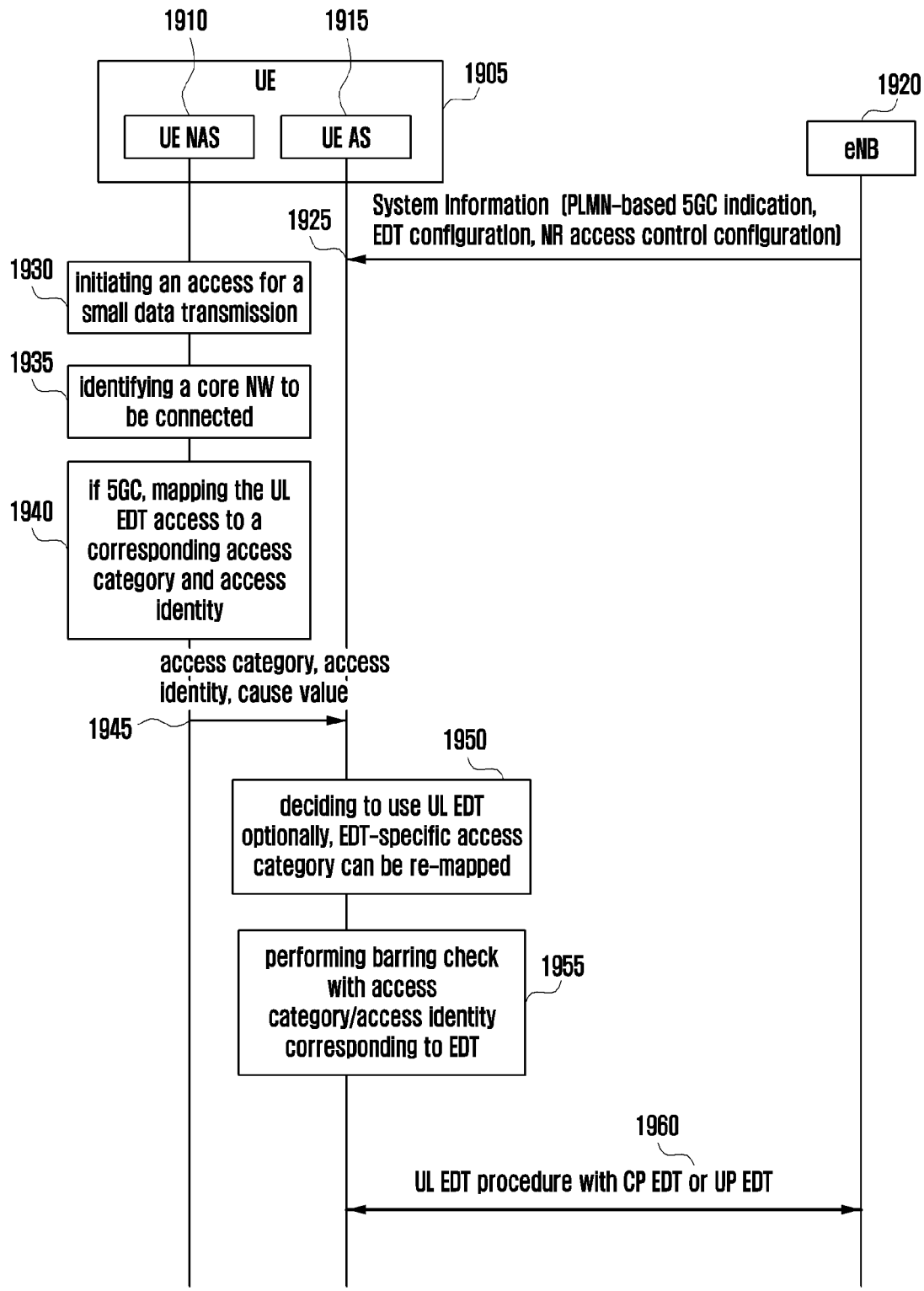
FIG. 19 is a flowchart illustrating a process in which a UE in a connected mode or in an inactive mode performs an access control in a second embodiment of the disclosure.

FIG. 19 is a flowchart illustrating a process in which a UE in a connected mode or in an inactive mode performs an access control in a second embodiment of the disclosure.

Referring to FIG. 19, a base station 1920 may store an indicator (indication is possible based on PLMN information) indicating being connected to 5GC, EDT configuration information, and NR barring configuration information in system information to be broadcasted (operation 1925). The EDT configuration information includes an indicator indicating whether to support CP EDT or UL EDT, and corresponds to maximum TBS information that can be transmitted through the EDT operation. NR barring configuration information is configuration information necessary to perform the barring check by access categories as described above.

A UE NAS 1910 triggers an access for transmitting uplink user data of a small size (operation 1930). If the base station 1920 is connected to the 5GC (operation 1935), the NAS 1910 may apply the NR access control, and for this, it maps the triggered access onto one access category and access identity (operation 1940). In advance, the network provides management object information to the NAS 1910 using an application-level data message (OAM) or NAS message. The information represents which element, such as an application, each operator-specific access category corresponds to.

In order to determine which operator-specific category the triggered access is mapped to, the NAS 1910 uses the above information. The triggered access corresponds to a new MINITEL service (voice call and video call), SMS transmission, new PDU session establishment, and existing PDU session change. If the access is triggered, the NAS 1910 maps the access identity and access category corresponding to the attribute of the access. The access may not be mapped onto any access identity, and may be mapped onto one or more access identities. Further, the access is necessarily mapped onto one access category. It is first confirmed whether the access is mapped onto the operator-specific access category provided from the management object. If the access is not mapped onto any operator-specific access category, the NAS 1910 maps the access onto the corresponding one of the standardized access categories. If the access can be mapped onto a plurality of access categories, the NAS 1910 performs mapping with priority in the order of the operator-specific access category and the standardized access category. In other words, if the access is not mapped onto any operator-specific access category, the NAS 1910 maps the access onto the corresponding one of the standardized access categories. In the mapping rule, standardized access category 0 and standardized access category 1 (emergency service) are excluded. That is, if the access can be mapped onto access categories 0 and 1, the NAS 1910 should preferentially map the access thereto.

In the second embodiment, since the UE AS 1915 determines whether the access interlocks with the EDT operation, the UE NAS 1910 does not process the access in consideration of the EDT. In other words, in the second embodiment, it is featured that the UE NAS 1910 maps the access onto the existing standardized access category 1 (delay tolerant access) or the existing standardized access category 7 (MO data). Further, in the second embodiment, it is featured that the access is mapped onto the delayTolerantAccess or MO data among the existing cause values. The NAS 1910 selects one cause value corresponding to the access, and provides the selected cause value to the AS 1915. Usually, the cause value is used for the base station 1920 to determine whether to reject the access.

The NAS 1910 transmits a new session request or Service Request to the AS 1915 together with the mapped access identity and access category, and the cause value (operation 1945). In the connected mode or inactive mode, the NAS 1910 transmits Service Request/new session request to the AS 1915, and in the idle mode, the NAS 1910 transmits the Service Request to the AS 1915.

If a predetermined condition is satisfied, the UE AS 1915 having received the Service Request or new se3ssion request may trigger the UL EDT with respect to the access (operation 1950). As an example, if the UE 1905 and the base station 1920 can support the UL EDT, and the size of the data is equal to or smaller than the configured TBS, the AS 1915 triggers the UL EDT (operation 1950).

As another option, if the UL EDT is triggered, the AS 1915 may again map the access category having been provided with respect to the access onto the new access category for the EDT access. The AS 1915 performs the barring check by applying the access category for the mapped EDT only again. In this case, the base station 1920 may provide the barring configuration information for the EDT-dedicated access category. Further, the AS 1915 may map the access onto the cause value (edtAccess) for the new UL EDT access only.

The AS 1915 receives and stores the barring configuration information from the system information being broadcasted by the network. An example of ASN.1 structure of the barring configuration information is as in Table 5 below, and the detailed explanation thereof will be made later.

ration information is provided by PLMNs and by access categories. BarringPerCatList IE is used to provide the barring configuration information of the access categories belonging to one PLMN. For this, PLMN id and the barring configuration information of the respective access categories are included in the IE in the form of a list. The barring configuration information by access categories includes an access category id (or index) indicating a specific access category, uac-BarringForAccessIdentity field, uac-BarringFactor field, and uac-Barringtime field. The above-mentioned barring check operation is as follows. First, respective bits constituting uac-BarringForAccessIdentityList correspond to one access identity, and if the bit value is indicated as "0", the access related to the access identity is allowed. If at least one of the corresponding bits in the uac-Barring ForAccessIdentity is "0" with respect to at least one of the mapped access identities, the access is allowed. If any one of the corresponding bits in the uac-Barring ForAccessIdentity is not "0" with respect to at least one of the mapped access identities, additional barring check to be described later is performed using additional uac-BarringFactor field. The uac-BarringFactor α is in the range of 0≤α<1. The UE AS 1915 derives one random value rand in the range of 0≤rand<1, and if the random value is smaller than the uac-BarringFactor, the UE AS 1915 considers that the access is not prohibited, whereas otherwise, the UE AS 1915 considers that the access is prohibited. If it is determined that the access is prohibited, the UE AS 1915 delays an access attempt for a predetermined time derived using Equation 2 below. The UE AS 1915 drives a timer having the above time value. In the disclosure, the timer is called barring timer.

$$\text{"Tbarring"} = (0.7 + 0.6 * \text{rand}) * uac\text{-}BarringTime. \qquad \text{Equation 2}$$

TABLE 5

```
UAC-BarringPerPLMN-List ::=    SEQUENCE (SIZE (1.. maxPLMN)) OF UAC-BarringPerPLMN
UAC-BarringPerPLMN ::=         SEQUENCE {
    plmn-IdentityIndex             INTEGER (1..maxPLMN),
    uac-ACBarringListType       CHOICE{
        uac-ImplicitACBerringList      SEQUENCE (SIZE(maxAccessCat-1)) OF UAC-BarringInfoSetIndex,
        uac-ExplicitACBerringList         UAC-BarringPerCatList
    }
}
UAC-BarringPerCatList ::= SEQUENCE (SIZE (1..maxAccessCat-1)) OF UAC-BarringPerCat
UAC-BarringPerCat ::= SEQUENCE {
    accessCategory               INTEGER (1..maxAccessCat-1),
    uac-barringInfoSetIndex          UAC-BarringInfoSetIndex
}
UAC-BarringInfoSetIndex ::=       INTEGER (1..maxBarringInfoSet)
UAC-BarringInfoSetList ::= SEQUENCE (SIZE(1..maxBarringInfoSet)) OF UAC-BarringInfoSet
UAC-BarringInfoSet ::= SEQUENCE {
    uac-BarringFactor           ENUMERATED {
                                    p00, p05, p10, p15, p20, p25, p30, p40,
                                    p50, p60, p70, p75, p80, p85, p90, p95},
    uac-BarringTime             ENUMERATED {s4, s8, s16, s32, s64, s128, s256, s512},
    uac-BarringPerAccessIdentity     BIT STRING (SIZE(7))
}
```

The AS 1915 determines whether the access request is allowed using the access identity and access category information mapped by the NAS 1910 and the corresponding barring configuration information received from the network (operation 1955). In the disclosure, the operation of determining whether the access request is allowed is called barring check. The UE 1905 receives the system information including the access control configuration information, and stores the configuration information. The barring configu- If the access is prohibited, the UE AS 1915 notifies the UE NAS 1910 of this. Further, if the derived predetermined time expires, the UE AS 1915 notifies the UE NAS 1910 that the access can be requested again (barring alleviation). From this time, the UE NAS 1910 may request the access again from the UE AS 1915.

If the service request is allowed in accordance with the predetermined rule, the AS 1915 performs a random access operation for the EDT (operation 1960).

Figure 20:
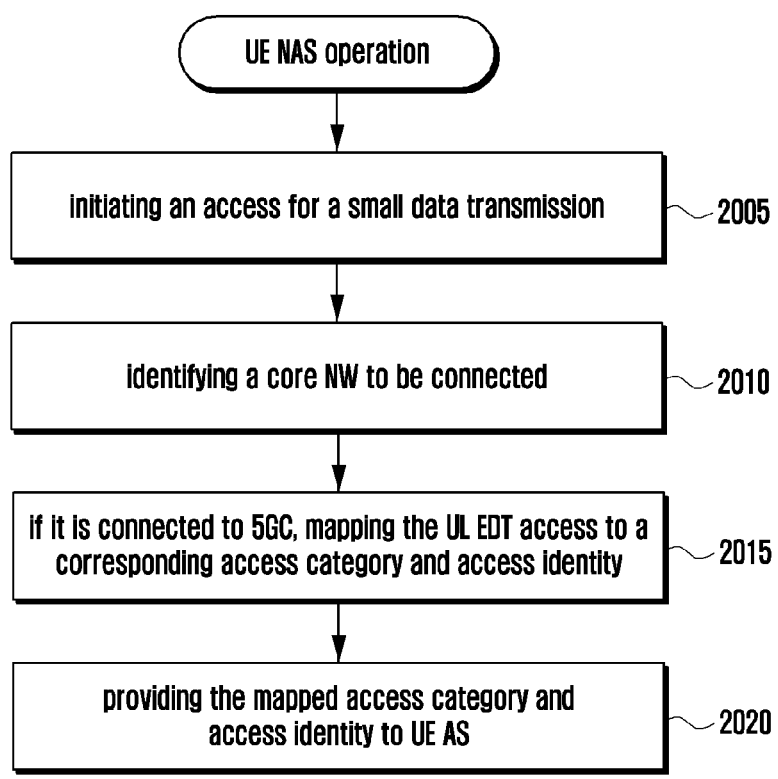
FIG. 20 is a flowchart illustrating a UE NAS operation in a second embodiment of the disclosure.

FIG. 20 is a flowchart illustrating a UE NAS operation in a second embodiment of the disclosure.

Referring to FIG. 20, the UE NAS, at operation 2005, initializes an access for transmitting user data of a small size.

At operation 2010, the UE NAS confirms a core network to perform the EDT operation. As an example, if the serving base station is connected to the 5GC, and the UE has previously performed a registration process in the 5GC, the UE NAS considers the connection to the 5GC, and performs the following operation. If the serving base station is not connected to the 5GC, or the UE has not previously performed a registration process in the 5GC, the UE NAS considers the connection to the MME, and performs the following operation.

At operation 2015, if the base station is connected to the 5GC (and the UE has previously completed the registration process in the 5GC), the UE NAS maps the access onto one access category and access identity in accordance with the predetermined rule. Further, the UE NAS determines the cause value corresponding to the access. In the disclosure, the new access category for the EDT is mapped, or the EDT access is mapped onto the existing access category 1 or access category 7.

At operation 2020, the UE NAS provides the determined access category, access identity, and cause value to the UE AS.

Figure 21:
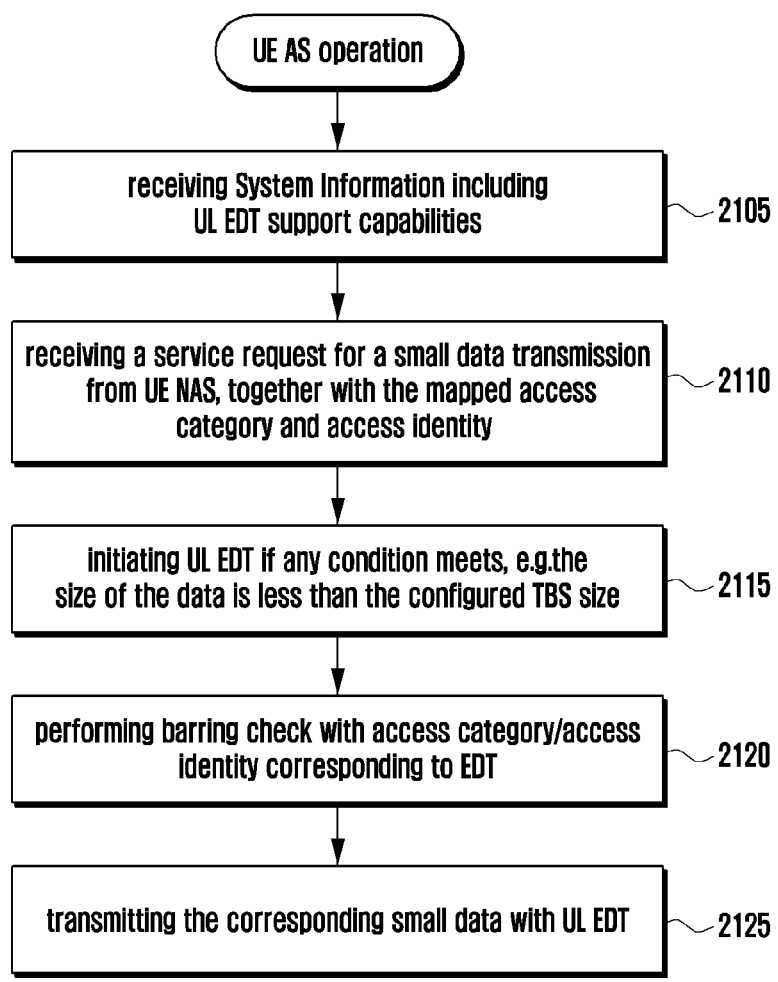
FIG. 21 is a flowchart illustrating a UE AS operation in a second embodiment of the disclosure.

FIG. 21 is a flowchart illustrating a UE AS operation in a second embodiment of the disclosure.

Referring to FIG. 21, the UE AS, at operation 2105, receives, from the base station, system information including an indicator (indication is possible based on PLMN information) indicating being connected to 5GC, EDT configuration information, and NR barring configuration information.

At operation 2110, the UE AS receives, from the UE NAS, the determined access category, access identity, and cause value.

At operation 2115, if the predetermined condition is satisfied, the UE AS determines to transmit the user data through an EDT operation. As an example, the predetermined condition corresponds to a case in which a serving base station supports an EDT operation, and the size of the user data is equal to or smaller than the maximum TBS size transmittable by the EDT provided by the base station.

At operation 2120, the UE AS performs the barring check by applying the provided NR barring configuration information, access category, and access identity. As another option, if the UL EDT is triggered, the AS maps again the access category having been provided with respect to the access onto the new access category for the EDT access, and performs the barring check by applying the access category. Further, the AS maps the access onto the cause value (edtAccess) for the new UL EDT access only.

At operation 2125, if it is judged that the EDT access is allowed in the barring check, the UE AS performs the random access for the EDT operation. In the random access process, the user data is transmitted. The cause value determined by the UE NAS or UE AS is stored in the RRCEarlyDataRequest or RRCConnectionResumeRequest message of the msg3.

Referring again to FIG. 16, the UE 1605 is composed of NAS 1610 and AS 1615. The NAS 1610 takes charge of processes that are not directly related to radio accesses, i.e., authentication, service request, and session management, whereas the AS 1615 takes charge of processes related to the radio accesses. The network provides management object information to the NAS 1610 using an application-level data message (OAM) or NAS message (operation 1625). The information represents which element, such as an application, each operator-specific access category corresponds to. In order to determine which operator-specific category the triggered access is mapped to, the NAS 1610 uses the above information. The triggered access corresponds to a new MINITEL service (voice call and video call), SMS transmission, new PDU session establishment, and existing PDU session change. If a service is triggered, the NAS 1610 maps the service onto the access identity and access category corresponding to the attribute of the service (operation 1650). The service may not be mapped onto any access identity, and may be mapped onto one or more access identities. Further, the service may be mapped onto one access category. Under the assumption that the service can be mapped onto one access category, the NAS 1610 first confirms whether the service is mapped onto the operator-specific access category provided from the management object. If the service is not mapped onto any operator-specific access category, the NAS 1610 maps the service onto the corresponding one of the standardized access categories. Under the assumption that the service can be mapped onto a plurality of access categories, the NAS 1610 maps one service onto one operator-specific access category and one standardized access category. However, if the service is not mapped onto any operator-specific access category, the NAS 1610 maps the service onto the corresponding one of the standardized access categories. In the mapping rule, an emergency service may be excluded. The NAS 1610 transmits a new session request or Service Request to the AS 1615 together with the mapped access identity and access category, and the cause value (operation 1655). In the connected mode or inactive mode, the NAS 1610 transmits the new session request to the AS 1615, and in the idle mode, the NAS 1610 transmits the Service Request to the AS 1615. The AS 1615 receives the barring configuration information from the system information being broadcasted by the network (operation 1625). An example of ASN.1 structure of the barring configuration information is as in Table 6 below, and the detailed explanation thereof will be made later.

TABLE 6

| | |
|---|---|
| UAC-BarringPerPLMN-List ::= | SEQUENCE (SIZE (1.. maxPLMN)) OF UAC-BarringPerPLMN |
| UAC-BarringPerPLMN ::= | SEQUENCE { |
|     plmn-IdentityIndex | INTEGER (1..maxPLMN), |
|     uac-ACBarringListType | CHOICE{ |
|         uac-ImplicitACBerringList | SEQUENCE (SIZE(maxAccessCat−1)) OF UAC-BarringInfoSetIndex, |
|         uac-ExplicitACBerringList | UAC-BarringPerCatList |
|     } | |
| } | |

TABLE 6-continued

```
UAC-BarringPerCatList ::= SEQUENCE (SIZE (1..maxAccessCat-1)) OF UAC-BarringPerCat
UAC-BarringPerCat ::= SEQUENCE {
    accessCategory              INTEGER (1..maxAccessCat-1),
    uac-barringInfoSetIndex     UAC-BarringInfoSetIndex
}
UAC-BarringInfoSetIndex ::=     INTEGER (1..maxBarringInfoSet)
UAC-BarringInfoSetList ::= SEQUENCE (SIZE(1..maxBarringInfoSet)) OF UAC-BarringInfoSet
UAC-BarringInfoSet ::= SEQUENCE {
    uac-BarringFactor           ENUMERATED {
                                    p00, p05, p10, p15, p20, p25, p30, p40,
                                    p50, p60, p70, p75, p80, p85, p90, p95},
    uac-BarringTime             ENUMERATED {s4, s8, s16, s32, s64, s128, s256, s512},
    uac-BarringPerAccessIdentity  BIT STRING (SIZE(7))
}
```

The AS 1615 determines whether the service request is allowed using the access identity and access category information mapped by the NAS 1610 and the corresponding barring configuration information received from the network (operation 1660). In the disclosure, the operation of determining whether the service request is allowed is called barring check. The UE 1605 receives the system information including the access control configuration information, and stores the configuration information. The barring configuration information is provided by PLMNs and by access categories. BarringPerCatList IE is used to provide the barring configuration information of the access categories belonging to one PLMN. For this, PLMN id and the barring configuration information of the respective access categories are included in the IE in the form of a list. The barring configuration information by access categories includes an access category id (or index) indicating a specific access category, uac-BarringForAccessIdentity field, uac-BarringFactor field, and uac-Barringtime field. The abovementioned barring check operation is as follows. First, respective bits constituting uac-BarringForAccessIdentityList correspond to one access identity, and if the bit value is indicated as "0", the access related to the access identity is allowed. If at least one of the corresponding bits in the uac-Barring ForAccessIdentity is "0" with respect to at least one of the mapped access identities, the access is allowed. If any one of the corresponding bits in the uac-Barring ForAccessIdentity is not "0" with respect to at least one of the mapped access identities, additional barring check to be described later is performed using additional uac-BarringFactor field. The uac-BarringFactor α is in the range of 0≤α<1. The UE AS 1615 derives one random value rand in the range of 0≤rand<1, and if the random value is smaller than the uac-BarringFactor, the UE AS 1615 considers that the access is not prohibited, whereas otherwise, the UE AS 1615 considers that the access is prohibited. If it is determined that the access is prohibited, the UE AS 1615 delays an access attempt for a predetermined time derived using Equation 3 below. The UE AS 1615 drives a timer having the above time value. In the disclosure, the timer is called barring timer.

$$\text{"Tbarring"} = (0.7 + 0.6 * \text{rand}) * uac\text{-}BarringTime. \quad \text{Equation 3}$$

If the access is prohibited, the UE AS 1615 notifies the UE NAS 1610 of this. Further, if the derived predetermined time expires, the UE AS 1615 notifies the UE NAS 1610 that the access can be requested again (barring alleviation). From this time, the UE NAS 1610 may request the access again from the UE AS 1615.

If the service request is allowed in accordance with the predetermined rule, the AS 1615 may request RRC connection establishment (or RRC connection resume) from the network, and transmits data related to the new session (operation 1665).

Figure 22:
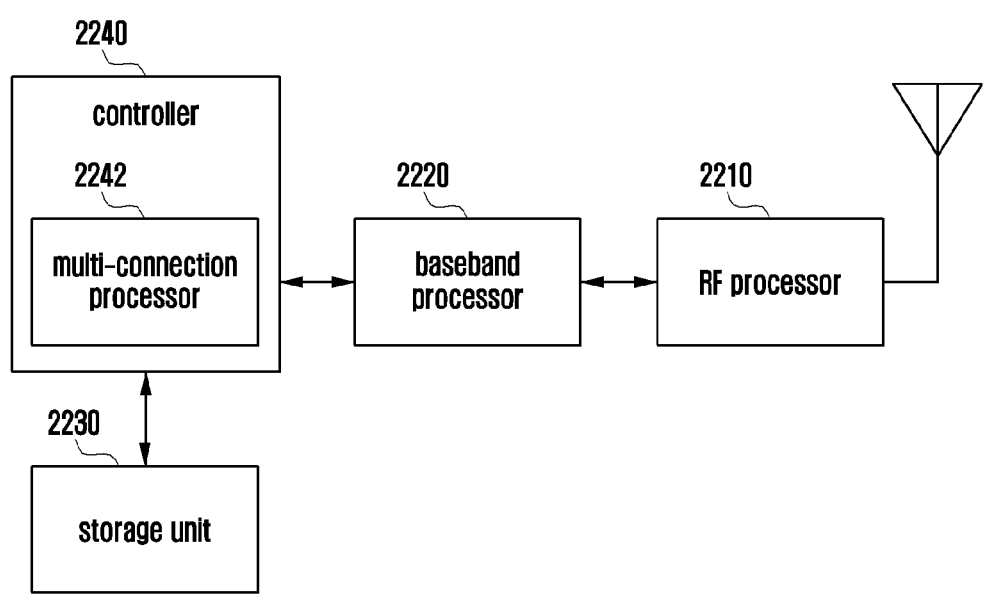
FIG. 22 is a block diagram illustrating the configuration of a UE according to an embodiment of the disclosure.

FIG. 22 is a block diagram illustrating the configuration of a terminal according to an embodiment of the disclosure.

Referring to FIG. 22, the terminal includes a radio frequency (RF) processor 2210, a baseband processor 2220, a storage unit 2230, and a controller 2240.

The RF processor 2210 performs a function for transmitting and receiving a signal on a radio channel, such as signal band conversion and amplification. That is, the RF processor 2210 performs up-conversion of a baseband signal provided from the baseband processor 2220 into an RF-band signal to transmit the converted signal through an antenna, and performs down-conversion of the RF-band signal received through the antenna into a baseband signal. For example, the RF processor 2210 may include a transmission filter, a reception filter, an amplifier, a mixer, an oscillator, a digital-to-analog converter (DAC), and an analog-to-digital converter (ADC). Although only one antenna is illustrated in FIG. 22, the terminal may be provided with a plurality of antennas. Further, the RF processor 2210 may include a plurality of RF chains. Further, the RF processor 2210 may perform beamforming. For the beamforming, the RF processor 2210 may adjust phases and sizes of signals transmitted or received through the plurality of antennas or antenna elements. Further, the RF processor 2210 may perform MIMO, and may receive several layers during performing of the MIMO operation.

The baseband processor 2220 performs a conversion function between a baseband signal and a bit string in accordance with the physical layer standard of the system. For example, during data transmission, the baseband processor 2220 generates complex symbols by encoding and modulating a transmitted bit string. Further, during data reception, the baseband processor 2220 restores a received bit string by demodulating and decoding the baseband signal provided from the RF processor 2210. For example, in case of following an orthogonal frequency division multiplexing (OFDM) method, during data transmission, the baseband processor 2220 generates complex symbols by encoding and modulating a transmitted bit string, performs mapping of the complex symbols onto subcarriers, and then configures OFDM symbols through the inverse fast Fourier transform (IFFT) operation and cyclic prefix (CP) insertion. Further, during data reception, the baseband processor 2220 divides the baseband signal being provided from the RF processor 2210 in the unit of OFDM symbols, restores the signals mapped onto the subcarriers through the fast Fourier transform (FFT) operation, and then restores the received bit string through demodulation and decoding.

The baseband processor 2220 and the RF processor 2210 transmit and receive the signals as described above. Accordingly, the baseband processor 2220 and the RF processor 2210 may be called a transmitter, a receiver, a transceiver, or a communication unit. Further, in order to support different radio access technologies, at least one of the baseband processor 2220 and the RF processor 2210 may include a plurality of communication modules. Further, in order to process signals of different frequency bands, at least one of the baseband processor 2220 and the RF processor 2210 may include different communication modules. For example, the different radio access technologies may include a wireless LAN (e.g., IEEE 802.11) and a cellular network (e.g., LTE). Further, the different frequency bands may include super high frequency (SHF) (e.g., 2.NR Hz or NR Hz) band and millimeter wave (e.g., 60 GHz) band.

The storage unit 2230 stores therein a basic program for an operation of the UE, application programs, and data of configuration information. Further, the storage unit 2230 provides stored data in accordance with a request from the controller 2240.

The controller 2240 controls the overall operation of the UE. For example, the controller 2240 transmits and receives signals through the baseband processor 2220 and the RF processor 2210. Further, the controller 2240 records or reads data in or from the storage unit 2230. For this, the controller 2240 may include at least one processor. For example, the controller 2240 may include a communication processor (CP) performing a control for communication and an application processor (AP) controlling a higher layer, such as an application program.

Figure 23:
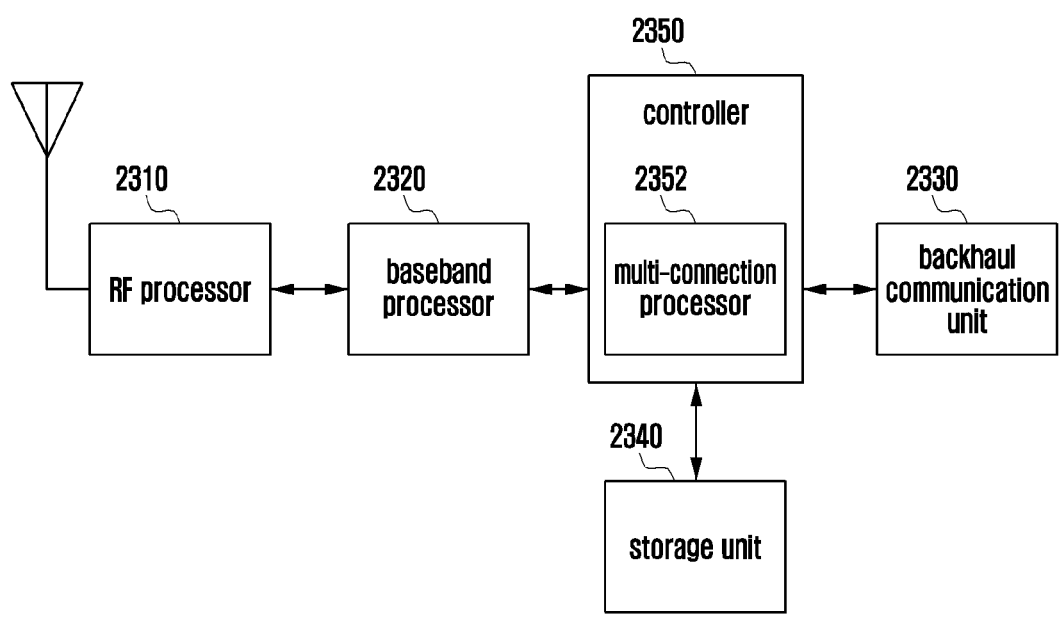
FIG. 23 is a block diagram illustrating the configuration of a base station according to an embodiment of the disclosure.

FIG. 23 is a block diagram illustrating the configuration of a base station according to an embodiment of the disclosure.

Referring to FIG. 23, a base station is configured to include an RF processor 2310, a baseband processor 2320, a backhaul communication unit 2330, a storage unit 2340, and a controller 2350.

The RF processor 2310 performs a function for transmitting and receiving a signal on a radio channel, such as signal band conversion and amplification. That is, the RF processor 2310 performs up-conversion of a baseband signal provided from the baseband processor 2320 into an RF-band signal to transmit the converted signal through an antenna, and performs down-conversion of the RF-band signal received through the antenna into a baseband signal. For example, the RF processor 2310 may include a transmission filter, a reception filter, an amplifier, a mixer, an oscillator, a DAC, and an ADC. Although only one antenna is illustrated in FIG. 23, the base station may be provided with a plurality of antennas. Further, the RF processor 2310 may include a plurality of RF chains. Further, the RF processor 2310 may perform beamforming. For the beamforming, the RF processor 2310 may adjust phases and sizes of signals transmitted or received through the plurality of antennas or antenna elements. The RF processor 2310 may perform down MIMO operation through transmission of one or more layers.

The baseband processor 2320 performs conversion function between a baseband signal and a bit string in accordance with the physical layer standard of the first radio access technology. For example, during data transmission, the baseband processor 2320 generates complex symbols by encoding and modulating a transmitted bit string. Further, during data reception, the baseband processor 2320 restores a received bit string by demodulating and decoding the baseband signal provided from the RF processor 2310. For example, in case of following an OFDM method, during data transmission, the baseband processor 2320 generates complex symbols by encoding and modulating a transmitted bit string, performs mapping of the complex symbols to subcarriers, and then configures OFDM symbols through the IFFT operation and CP insertion. Further, during data reception, the baseband processor 2320 divides the baseband signal provided from the RF processor 2310 in the unit of OFDM symbols, restores the signals mapped to the subcarriers through the FFT operation, and then restores the received bit string through demodulation and decoding. The baseband processor 2320 and the RF processor 2310 transmit and receive the signals as described above. Accordingly, the baseband processor 2320 and the RF processor 2310 may be called a transmitter, a receiver, a transceiver, a communication unit, or a wireless communication unit.

The backhaul communication unit 2330 provides an interface for performing communication with other nodes in the network. That is, the backhaul communication unit 2330 converts a bit string being transmitted from the base station to other nodes, for example, an auxiliary base station and a core network, into a physical signal, and converts the physical signal being received from other nodes into a bit string.

The storage unit 2340 stores therein a basic program for an operation of the base station, application programs, and data of configuration information. In particular, the storage unit 2340 may store information on a bearer allocated to the connected UE and the measurement result reported from the connected UE. Further, the storage unit 2340 may store information that becomes a basis of determination whether to provide or suspend a multi-connection to the UE. Further, the storage unit 2340 provides stored data in accordance with a request from the controller 2350.

The controller 2350 controls the overall operation of the base station. For example, the controller 2350 transmits and receives signals through the baseband processor 2320 and the RF processor 2310 or through the backhaul communication unit 2330. Further, the controller 2350 records or reads data in or from the storage unit 2340. For this, the controller 2350 may include at least one processor.

Meanwhile, embodiments of the disclosure that are described in the specification and drawings are merely for easy explanation of the technical contents of the disclosure and proposal of specific examples to help understanding of the disclosure, but are not intended to limit the scope of the disclosure. That is, it will be apparent to those of ordinary skill in the art to which the disclosure pertains that other modified examples that are based on the technical idea of the disclosure can be embodied. Further, according to circumstances, the respective embodiments may be operated in combination. For example, parts of the embodiments of the disclosure may be combined with each other to operate a base station and a UE.

The invention claimed is:

1. A method performed by a terminal in a communication system, the method comprising:
 receiving, from a base station, system information including first information on a dedicated random access preamble for small data transmission performed by a 2-step random access and second information on a data size threshold for the small data transmission;
 identifying an uplink user data that awaits transmission;
 identifying whether a size of the uplink user data is less than or equal to the data size threshold;

in case that the size of the uplink user data is less than or equal to the data size threshold, initiating the small data transmission for transmitting the uplink user data while the terminal is in a radio resource control (RRC) inactive state; and in case that the small data transmission is initiated, transmitting, to the base station, the dedicated random access preamble associated with a message A (MsgA) of the 2-step random access and transmitting, to the base station, a RRC resume request message associated with the MsgA and the uplink user data associated with the MsgA.

2. The method of claim 1, further comprising:
wherein the small data transmission is performed by the 2-step random access without transitioning the terminal to an RRC connected state.

3. The method of claim 1,
wherein the RRC resume request message includes at least one of a resume identity (ID), a resume cause, or a resume message authentication code-integrity (MAC-I).

4. The method of claim 1, further comprising:
as a response to the dedicated random access preamble associated with the MsgA, receiving, from the base station, a random access response associated with a message B (MsgB) of the 2-step random access.

5. A method performed by a base station in a communication system, the method comprising:
transmitting, to a terminal, system information including first information on a dedicated random access preamble for small data transmission performed by a 2-step random access and second information on a data size threshold for the small data transmission; and in case that the small data transmission is initiated, receiving, from the terminal, the dedicated random access preamble associated with a message A (MsgA) of the 2-step random access and receiving, from the terminal, a radio resource control (RRC) resume request message associated with the MsgA and uplink user data associated with the MsgA, wherein, in case that a size of the uplink user data is less than or equal to the data size threshold, the small data transmission for transmitting the uplink user data while the terminal is in an RRC inactive state is initiated.

6. The method of claim 5,
wherein the small data transmission is performed by the 2-step random access without transitioning the terminal to an RRC connected state.

7. The method of claim 5,
wherein the RRC resume request message includes at least one of a resume identity (ID), a resume cause, or a resume message authentication code-integrity (MAC I).

8. The method of claim 5, further comprising:
as a response to the dedicated random access preamble associated with the MsgA, transmitting, to the terminal, a random access response associated with a message B (MsgB) of the 2-step random access.

9. A terminal in a communication system, the terminal comprising:
a transceiver; and
a controller configured to control to:
receive, from a base station via the transceiver, system information including first information on a dedicated random access preamble for small data transmission performed by a 2-step random access and second information on a data size threshold for the small data transmission, identify an uplink user data that awaits transmission,
identify whether a size of the uplink user data is less than or equal to the data size threshold, in case that the size of the uplink user data is less than or equal to the data size threshold, initiate the small data transmission for transmitting the uplink user data while the terminal is in a radio resource control (RRC) inactive state, and in case that the small data transmission is initiated, transmit via the transceiver, to the base station, the dedicated random access preamble associated with, a message A (MsgA) of the 2-step random access and transmitting, to the base station, a RRC resume request message associated with the MsgA and the uplink user data associated with the MsgA.

10. The terminal of claim 9, wherein the small data transmission is performed by the 2-step random access without transitioning the terminal to an RRC connected state.

11. The terminal of claim 9,
wherein the RRC resume request message includes at least one of a resume identity (ID), a resume cause, or a resume message authentication code-integrity (MAC-I).

12. The terminal of claim 9, wherein the controller is further configured to:
as a response to the dedicated random access preamble associated with the MsgA, receive, from the base station via the transceiver, a random access response associated with a message B (MsgB) of the 2-step random access.

13. A base station in a communication system, the base station comprising:
a transceiver; and
a controller configured to control to:
transmit, to a terminal via the transceiver, system information including first information on a dedicated random access preamble for small data transmission performed by a 2-step random access and second information on a data size threshold for the small data transmission, and in case that the small data transmission is initiated, receive via the transceiver, from the terminal, the dedicated random access preamble associated with a message A (MsgA) of the 2-step random access and receiving, from the terminal, a radio resource control (RRC) resume request message associated with the MsgA and uplink user data associated with the MsgA, wherein, in case that a size of the uplink user data is less than or equal to the data size threshold, the small data transmission for transmitting the uplink user data while the terminal is in an RRC inactive state is initiated.

14. The base station of claim 13, wherein the small data transmission is performed by the 2-step random access without transitioning the terminal to an RRC connected state.

15. The base station of claim 13,
wherein the RRC resume request message includes at least one of a resume identity (ID), a resume cause, or a resume message authentication code-integrity (MAC I).

16. The base station of claim 13, wherein the controller is further configured to:
  as a response to the dedicated random access preamble associated with the MsgA, transmit via the transceiver, to the terminal, a random access response associated with a message B (MsgB) of the 2-step random access.

* * * * *